United States Patent
Yamazoe et al.

[11] Patent Number: 5,439,204
[45] Date of Patent: Aug. 8, 1995

[54] VIBRATION ISOLATOR

[75] Inventors: Hisamitsu Yamazoe, Kariya; Tokio Kohama, Nishio; Shuji Mizutani, Obu; Toshiaki Agui, Koga, all of Japan

[73] Assignee: Nippondenso Co., Ltd., Kariya, Japan

[21] Appl. No.: 242,958

[22] Filed: May 16, 1994

[30] Foreign Application Priority Data

| May 17, 1993 | [JP] | Japan | 5-115061 |
| Jul. 28, 1993 | [JP] | Japan | 5-185657 |
| Aug. 2, 1993 | [JP] | Japan | 5-191180 |

[51] Int. Cl.⁶ .................................................. F16F 13/00
[52] U.S. Cl. .................................. 267/140.14; 267/219
[58] Field of Search ................ 267/140.14, 140.13, 267/140.15, 219, 220, 35, 140.11, 140.12; 188/267; 180/300, 312, 902; 248/550, 636, 562; 280/707

[56] References Cited

U.S. PATENT DOCUMENTS

| 4,583,723 | 4/1986 | Ozawa . |
| 4,650,170 | 3/1987 | Fukushima . |
| 4,660,812 | 4/1987 | Dan et al. . |
| 4,693,455 | 9/1987 | Andra . |
| 4,793,599 | 12/1988 | Ishioka . |
| 4,793,600 | 12/1988 | Kojima . |
| 4,877,225 | 10/1989 | Noguchi et al. ............ 267/140.14 |
| 5,242,158 | 9/1993 | Robic et al. . |
| 5,333,455 | 8/1994 | Yoshioka ............ 267/140.14 |

FOREIGN PATENT DOCUMENTS

| 0536761 | 4/1993 | European Pat. Off. . |
| 4312229 | 11/1992 | Japan . |
| 4312230 | 11/1992 | Japan . |
| 599262 | 4/1993 | Japan . |
| 599263 | 4/1993 | Japan . |
| 2228551 | 8/1990 | United Kingdom . |

OTHER PUBLICATIONS

McDonald, et al.: "Implications of Active Control in Automotive Engineering Design", vol. 46, No. 6, 1992.
Ushijima, et al.: "Active Engine Mount with Piezo-Actuator for Vibration Control", 930201.
"Advanced Rubber Technology is solving fluid flow and engine-mount problems" Automotive Engineer.
Haldenwanger et al.: "Automobile Technical Journal'-'—95—1993.

*Primary Examiner*—Douglas C. Butler
*Attorney, Agent, or Firm*—Cushman, Darby & Cushman

[57] ABSTRACT

A vibration isolator designed to improve mounting facility is disposed between a vibration source and a base on which the vibration source is supported. The vibration isolator has an elastic member provided between the vibration source and the base to elastically support the vibration source, a main chamber in which a fluid is enclosed and the volume of which is changed according to a deformation of the elastic member, a sub chamber defined by an elastic membrane and communicating with the main chamber through an orifice, a moving member provided in a fluid chamber formed by the main and sub chambers, and an actuator for driving the moving member. The actuator is fixed to the elastic membrane in a fluid sealing manner, and drives the moving member from the outside of the fluid chamber formed by the main and sub chambers through attachment members connected to the moving member.

20 Claims, 18 Drawing Sheets

FERRITE MAGNET
($\phi 75 \times \phi 32 \times 10$)

SAMARIUM COBALT MAGNET
($\phi 72 \times \phi 46 \times 8$)

Dp : CENTER POLE DIAMETER
Lg : GAP LENGTH
T1 : TOP PLATE THICKNESS
T2 : BOTTOM PLATE THICKNESS
Dmo: MAGNET OUTSIDE DIAMETER
Dmi : MAGNET INSIDE DIAMETER
Lm : MAGNET THICKNESS
T : COIL THICKNESS
h : COIL HEIGHT
N : NUMBER OF COIL TURNS

FIG.15

| ENGINE SPEED N (rpm) | 600 | 800 | 1000 | 1200 | 4400 | 4600 | 4800 | 5000 | 5200 | 5400 | 5600 | 5800 | 6000 |
|---|---|---|---|---|---|---|---|---|---|---|---|---|---|
| OPTIMAL PHASE ANGLE $\Delta\theta$ (°CA) | 198 | 176 | 168 | 165 | 182 | 184 | 186 | 190 | 195 | 200 | 208 | 213 | 220 |
| OPTIMAL CURRENT Ip (A) | 4.6 | 5.0 | 5.1 | 5.2 | 2.3 | 2.1 | 2.1 | 2.3 | 2.5 | 2.8 | 3.3 | 3.8 | 4.5 |

FIG.18

| ITEM | VOICE COIL A | VOICE COIL B |
|---|---|---|
| MAGNET MATERIAL | FERRITE | RARE EARTH (SAMARIUM COBALT) |
| CENTER POLE DIAMETER $D_p$ (mm) | 25 | 33 |
| GAP LENGTH $L_g$ (mm) | 1.16 | 3.9 |
| TOP PLATE THICKNESS $T_1$ (mm) | 4.5 | 5.4 |
| BOTTOM PLATE THICKNESS $T_2$ (mm) | 5.0 | 7.0 |
| MAGNET OUTSIDE DIAMETER $D_{mo}$ (mm) | 75 | 72 |
| MAGNET INSIDE DIAMETER $D_{mi}$ (mm) | 32 | 46 |
| MAGNET THICKNESS $L_m$ (mm) | 10 | 8 |
| RESIDUAL MAGNETIC FLUX DENSITY $B_r$ (Gaus) | 4200 | 10400 |
| GAP MAGNETIC FLUX DENSITY $B_g$ (Gaus) | 10000 | 6500 |
| CONDUCTOR DIAMETER $d$ (mm) | 0.16 | 0.5 |
| COIL THICKNESS $T$ (mm) | 0.30 | 2.45 |
| COIL HEIGHT $h$ (mm) | 7.7 | 12.3 |
| NUMBER OF COIL TURNS $N$ | 81 | 160 |
| NUMBER OF COIL LAYERS | 2 | 5 |
| MAXIMUM ALLOWABLE CURRENT $I_{max}$ (A) | 1.6 | 1.6 |
| MAXIMUM POWER OUTPUT (N) | 11.3 | 11.3 |
| MAGNET SIZE (mm) | $\phi 75 \times \phi 32 \times 10$ | $\phi 72 \times \phi 46 \times 8$ |
| MAGNET VOLUME (cm³) | 36.14 | 19.28 |
| SPECIFIC GRAVITY (g/cm³) | 5.58 | 11.01 |
| WEIGHT (g) | 201.7 | 212.3 |
| MATERIAL COST RATIO | 1/50 | 1 |

VIBRATION ISOLATOR

BACKGROUND OF THE INVENTION

1. Field of the Invention

This invention relates to a vibration isolator provided between a vibration source and a base to control transmission of vibrations or from the vibration source to the base. The present invention is particularly suitable to an electronically controlled engine mount capable of changing damping characteristics according to conditions of vibrations input from an engine, vehicle driving conditions and other factors.

2. Description of the Related Art

As is well known, an engine is mounted on a body of a vehicle through an engine mount to prevent transmission of vibration from the engine to the vehicle body and to prevent transmission of engine shakes caused when the vehicle is abruptly accelerated or decelerated, or when the vehicle is started or braked. For example, U.S. Pat. No. 4,693,455 discloses an engine mount designed mainly to prevent transmission of vibration from an engine to a vehicle body.

FIG. 19 is a cross-sectional view of a conventional engine mount. As shown in FIG. 19, a housing 301 of the engine mount is generally cylindrical shaped and has an upper opening closed with a stay 303 and an elastic member 302 made of rubber and interposed between an opening portion and the stay 303. A partition member 304 in the form of a disk is positioned and fixed in the housing 301 to form a main fluid chamber 305 on the stay 303 side of partition member 304. A non-compressive fluid is enclosed in the main fluid chamber 305. A central portion of the partition member 304 is recessed to form an air chamber 306 in which a moving member 308 around which a moving coil 307 is wound is provided, and a permanent magnet (ferrite magnet) 309 in the form of a ring is provided around the moving member 308 so as to face the moving coil 307. The moving coil 307, the moving member 308 and the permanent magnet 309 constitute a voice coil 310. A sheet-like member 311 made of rubber is bonded to an upper surface of the partition member 304 so as to close the air chamber 306. The sheet-like member 311 prevents the non-compressive fluid in the main fluid chamber 305 from flowing into the air chamber 306. The moving member 308 is bonded to a lower surface of the sheet-like member 311. The moving member 308 is allowed to move slightly in a direction along an axis L of the engine mount, while its movement in the direction perpendicular to the axis L is limited.

A diaphragm 312 is positioned and fixed under the partition member 304. A sub fluid chamber 313 in which the non-compressive fluid is also enclosed is formed between the partition member 304 and the diaphragm 312. The sub fluid chamber 313 communicates with the main fluid chamber 305 through orifices formed in a peripheral portion of the partition member 304. As is well known, a damping effect is achieved when the non-compressive fluid passes through the orifices 314.

The thus-constructed engine mount is interposed between an engine and a vehicle body, with its housing 301 fixed to the vehicle body, and with a bolt 303a, which is welded to an upper surface of the stay 303, fixed to the engine. If the elastic member 302 is bent in a vertical direction by vibrations from the engine, periodic vibrations are input to the non-compressive fluid in the main fluid chamber 305. At this time, an alternating current having the same period as the vibrations is caused to flow through the moving coil 307 to forcibly vibrate the moving member 308 so that vibrations having a phase opposite that of the vibrations from the engine are input to the non-compressive fluid in the main fluid chamber 305. In this manner, the dynamic spring constant of the engine mount is reduced to shut off vibrations from the engine.

In the above-described engine mount, vibrations of the moving member 308 are transmitted to the non-compressive fluid in the main fluid chamber 305 through the sheet-like member 311, because a liquid seal is maintained by the sheet 311 between the main fluid chamber 305 and the air chamber 306. That is, the sheet-like member 311 made of rubber acts to dampen the vibration of the moving member 308. Therefore, the vibration of the moving member 308 cannot be smoothly transmitted to the non-compressive fluid, so that the dynamic spring constant of the engine mount is not sufficiently reduced and the vibration isolation effect is not satisfactorily achieved.

U.S. Pat. No. 4,793,599, discloses a power unit mounting apparatus using an actuator formed of a double coil, and U.S. Pat. No. 4,650,170 discloses a vibration isolator using an actuator formed of a solenoid. In these apparatuses, a smaller dynamic spring constant can be obtained by causing a moving member or a vibrating member (moving plate) to vibrate in a direction of phase in opposition to input vibrations, and a larger dynamic spring constant can be obtained by causing the moving member to vibrate in a direction in phase with input vibrations. In an engine mount such as that described above, vibrations from an engine are limited by selecting the smaller dynamic spring constant in a steady state during idling or the like, and engine shakes are prevented by selecting the larger dynamic spring constant during a transient operation. In these apparatuses, however, the stroke of movement of the moving member or vibrating member (moving plate) is constant. It is therefore difficult to vary the vibration smoothing ability.

As is well known, the efficient of the voice coil 310 is higher if the gap between the moving coil 307 and the permanent magnet 309 is smaller. In the above-described engine mount, however, the moving member 308 is affixed to the sheet-like member 311. Therefore, if the sheet-like member 311 is bent with a displacement of the moving member 308, the center of the moving member 308 deviates from the axis L so that the gap is changed. Consequently, the gap cannot be sufficiently reduced, as a result, there is a need to increase the size of the voice coil 310 to compensate for a reduction in the efficiency of the voice coil 310, resulting in an increase in the overall size of the engine mount.

Also, Japanese Patent Unexamined Publication No. 4-312229 discloses a fluid-enclosed vibration isolator for an engine mount. In this vibration isolator, an actuator is not inserted in alignment with a vibration isolating rubber member, and vibration isolation is made with a smaller operating energy. For energy saving, the actuator of this vibration isolator is also arranged as a voice coil type. However, it use an expensive rare earth magnet, that is, it was not suitably designed to reduce the manufacturing cost of the engine mount.

SUMMARY OF THE INVENTION

An object of the present invention is to provide a vibration insulator having an improved mounting facility.

Another object of the present invention is to provide an electronically controlled engine mount which is designed to use a low-priced magnet without reducing the efficiency of an actuator and which, therefore, has a high commodity value.

Still another object of the present invention is to provide an electronically controlled engine mount designed in this manner and having improved vibration isolating ability.

A further object of the present invention is to provide a power unit mounting apparatus arranged without using a sheet or the like for maintaining a fluid seal for a main fluid chamber, capable of controlling a dynamic spring constant to a suitable level always suitably by smoothly transmitting vibrations from a moving member to a non-compressive fluid in the main fluid chamber, capable of preventing an actuator for driving the moving member from being influenced by the sheet and other members, and capable of improving the efficiency of the actuator while reducing the overall size of the mounting apparatus.

To achieve these objects, according to one aspect of the present invention, there is provided a vibration isolator disposed between a vibration source and a base on which the vibration source is supported, the vibration isolator comprising an elastic member provided between the vibration source and the base to elastically support the vibration source, a main chamber in which a fluid is enclosed and the volume of which is changed according to a deformation of the elastic member, a sub chamber defined By an elastic membrane and communicating with the main chamber through an orifice, a moving member provided in a fluid chamber formed by the main and sub chambers, and an actuator for driving the moving member, the actuator being fixed to the elastic membrane in a fluid sealing manner, the actuator driving the moving member from the outside of the fluid chamber formed by the main and sub chambers through attachment means connected to the moving member.

According to another aspect of the present invention, there is provided an engine mounting apparatus disposed between an engine and a vehicle body, comprising attachment means on the engine side, attachment means on the vehicle body side, a housing assembly fixed on the vehicle body side attachment means, an elastic member provided between the vehicle body side attachment means and the housing assembly to elastically support the engine, a main fluid chamber being formed between the elastic member and partition means provided in the housing assembly, a moving member accommodated in a communication hole formed through the partition means, the moving member being movable in an axial direction, an elastic membrane formed on the housing interior side of the partition means so as to cover at least the communication hole, a sub fluid chamber being formed between the elastic membrane and the partition means, an air chamber being formed between the elastic membrane and a portion of the housing assembly, an actuator accommodated in the air chamber in the housing assembly and having a moving portion capable of moving along a direction of movement of the moving plate, and attachment means for connecting the elastic membrane and the moving plate in the sub fluid chamber and for connecting the elastic membrane and the moving portion of the actuator in the air chamber.

An electronically controlled engine mount in accordance with the present invention has main and sub fluid chambers provided between a vehicle body and an engine, in which a non-compressive fluid is enclosed, and the volume of which is changed by vibrations input from the engine, the sub fluid chamber communicating with the main fluid chamber though an orifice opening, and a moving member disposed at one end of the main fluid chamber and caused by an actuator to vibrate by being linked to the input vibrations so that the spring constant of the engine mount can be freely changed. In this engine mount, the actuator has magnetic members magnetized by a permanent magnet, and a voice coil formed of a moving coil formed integrally with the above-mentioned moving member and inserted into a gap formed between the magnetic members. The gap into which the moving coil is inserted is set to 1.5 mm or less.

The present invention has been acheived by considering the fact that the gap magnetic flux density based on the residual magnetic flux density of the permanent magnet can be exponentially increased to increase the voice coil output if the gap formed between the magnetic members magnetized by the permanent magnets, into which the moving coil of the voice coil is inserted, is reduced. If the gap is set to 1.5 mm or less, a large magnetic flux density can be obtained in the gap without changing the size of the permanent magnet. Therefore, the efficiency of the actuator formed of the voice coil can be improved and the voice coil can be designed to output a desired power using a low-priced ferrite magnet as the permanent magnet instead of a rare earth magnet.

An electronically controlled engine mount in accordance with the present invention, having main and sub fluid chambers which are provided between a vehicle body and an engine, in which a non-compressive fluid is enclosed, and the volume of which is changed by vibrations input from the engine, the sub fluid chamber communicating with the main fluid chamber though an orifice opening, and a moving member disposed at one end of the main fluid chamber and caused by an actuator to vibrate by being linked to the input vibrations so that the spring constant of the engine mount can be freely changed, also comprises map memory means in which the relationship between maximum values of a control signal to the actuator and phase angles for setting a minimum or maximum spring constant with respect to the rotational speed of the engine is stored as a map. The electronically controlled engine mount also has actuator drive means for calculating a maximum value and a phase angle of the control signal with respect to the present engine speed on the basis of the map, and for driving the actuator on the basis of the maximum value and the phase angle calculated.

In accordance with the present invention, the relationship between maximum values of the control signal and phase angles for setting a minimum or maximum spring constant with respect to the rotational speed of the engine is stored as a map. A maximum value and a phase angle of the control signal with respect to the present engine speed are calculated on the basis of the map. The actuator is driven on the basis of the maximum value and the phase angle calculated from the map. It is therefore possible to suitably change the spring constant of the engine mount with respect to vibratiosn caused by engine revolutions.

A power unit mounting apparatus in accordance with the present invention is provided between a vehicle body and a power unit and has a main fluid chamber in which a non-compressive fluid is enclosed, and the volume of which is changed by vibrations input from the power unit. A moving member disposed at one side of the main fluid chamber is caused by an actuator to vibrate by being linked to the input vibrations so that the spring constant of the mouting apparatus can be changed. The power unit mounting apparatus also has a sub fluid chamber which is formed adjacent to the main fluid chamber with a partition wall interposed. The non-compressive fluid is also enclosed in the sub fluid chamber, and the volume of the sub fluid chamber can be changed. A communication hole is formed in the partition wall so as to provide a communication between the main and sub fluid chambers. The moving member is disposed in the communication hole with a small gap formed between the inner circumference of the hole and the outer circumference of the moving member. The moving member is movable therein along a line connecting the main and sub fluid chambers.

In accordance with the present invention, the gap between the moving member and the communication hole is very small. It is therefore possible to prevent the non-compressive fluid in the main and sub fluid chambers from passing through the gap by the effect of viscosity thereof. Accordingly, when the moving member is caused to vibrate by the actuator and by being linked to vibration input from the power unit, the vibration of the moving member is input to the non-compressive fluid in the main fluid chamber while changing the volume of the sub fluid chamber, thereby changing the spring constant of the mounting apparatus.

Thus, there is no need for a particular fluid sealing member between the main and sub fluid chambers. Therefore, there is no possibility of the vibration of the moving member being impeded by such fluid sealing member. It is therefore possible to control the dynamic spring constant accurately by smoothly transmitting vibrations from the moving member to the non-compressive fluid in the main fluid chamber. Moreover, because the actuator is not influenced by the fluid sealing member, it is possible to improve the efficiency of the actuator and to reduce the size of the actuator, for example, by reducing air gaps between a moving coil and magnetic members, if the actuator is formed of a voice coil.

BRIEF DESCRIPTION OF THE DRAWINGS

FIG. 15 is a table showing data which is stored as a map in the electronically controlled engine mount of the first embodiment of the invention, and which designates optimal phase angles and optimal currents with respect to engine speeds;

FIG. 18 is a comparison table showing specifications such as dimensions of the voice coil of the first embodiment of the invention and a conventional voice coil.

DESCRIPTION OF THE PREFERRED EMBODIMENTS

Preferred embodiments of the present invention will be described below with reference to the drawings.

First Embodiment

Figure 1:
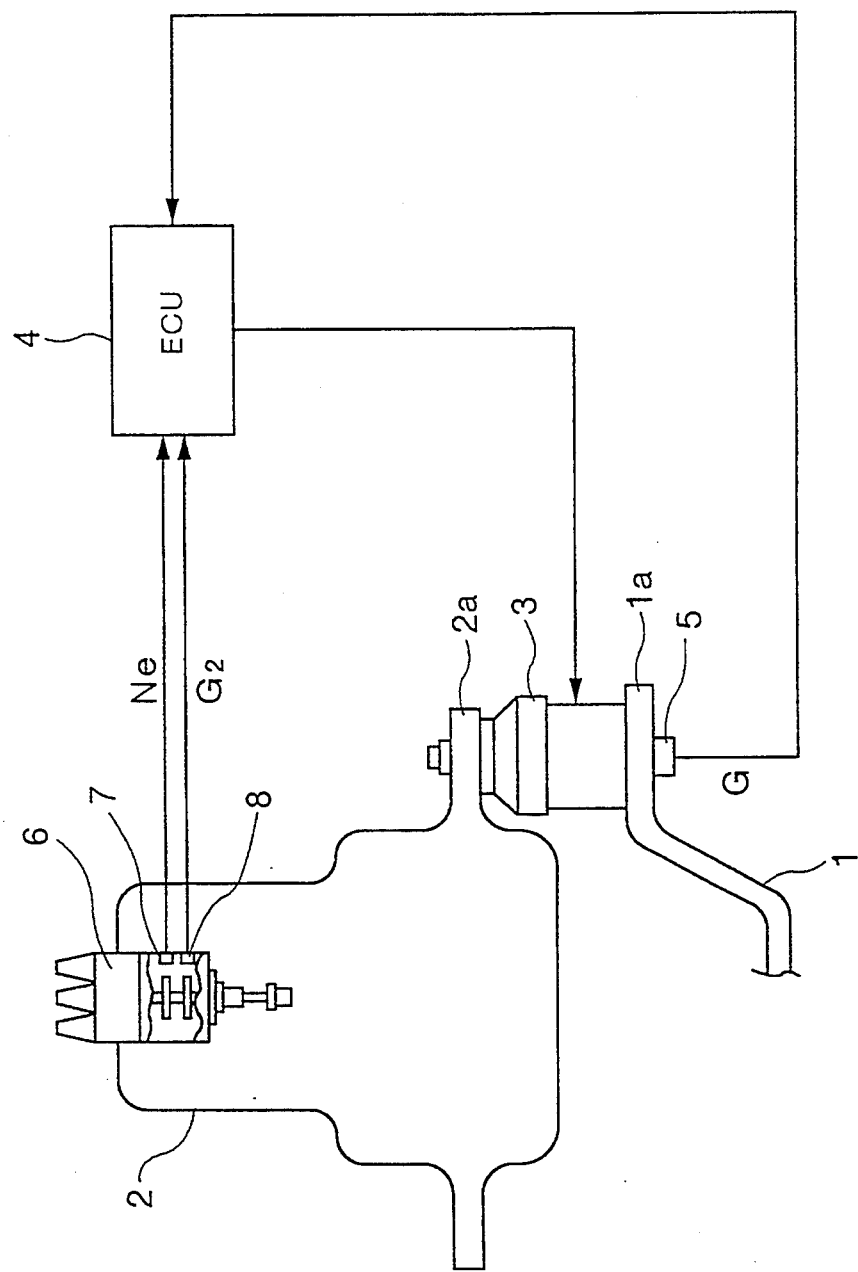
FIG. 1 is a schematic diagram of the overall construction of an electronically controlled engine mount in accordance with a first embodiment of the present invention.
Figure 2:
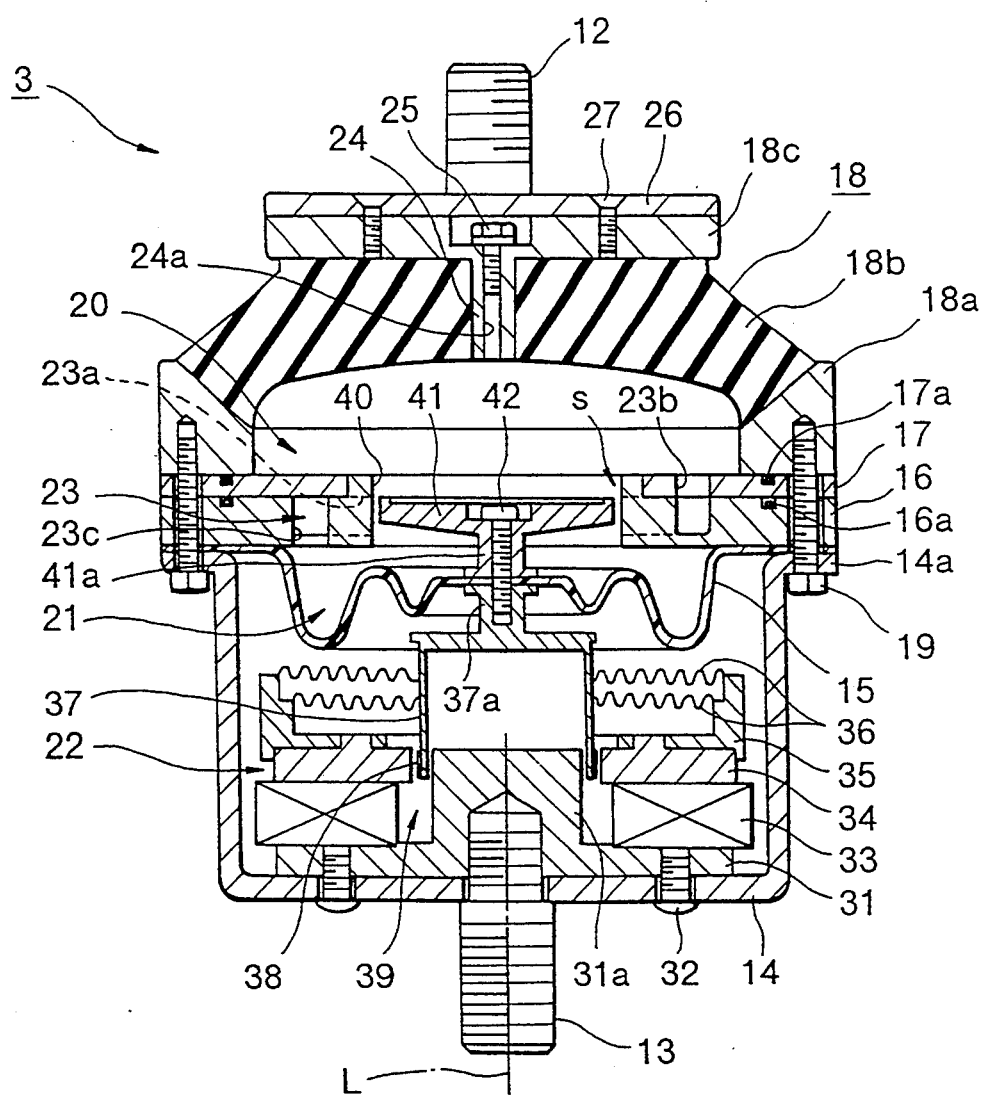
FIG. 2 is a cross-sectional view of details of an engine mount unit in the electronically controlled engine mount of the first embodiment of the present invention.

FIG. 1 is a schematic diagram of the entire construction of an electronically controlled engine mount in accordance with a first embodiment of the present invention, and FIG. 2 is a cross-sectional view of details of the engine mount in accordance with the first embodiment of the present invention.

As shown in FIG. 1, the electronically controlled engine mount of this embodiment has an engine mount unit 3 provided between a stay 1a on a vehicle body 1 and a stay 2a on an engine 2, and an electronic control unit (ECU) 4 for controlling the engine mount unit 3. The electronically controlled engine mount also has an acceleration sensor 5, which is attached to the stay 1a on the vehicle body 1 and which outputs an acceleration signal G in accordance with vibrations caused in the vehicle body 1, a rotational angle sensor 7, which is provided in a distributor 6 of the engine 2 and which outputs a rotational angle signal Ne relating to the rotational speed of the distributor 6, and a reference position sensor 8 which is also provided in the distributor 6 and which outputs a reference position signal G2 representing a crank angle reference position. Each of the rotational angle sensor 7 and the reference position sensor 8 comprises a kind of magnetic pickup.

The construction of the engine mount unit 3 will be described in detail.

As shown in FIG. 2, the engine mount unit 3 is used with its lower-end bolt 13 fastened to the vehicle body 1 and its upper-end volt 12 fastened to the engine 2. A mount housing 14 of the engine mount unit 3 is a cylindrical member opened at its top and closed at its bottom. The mount housing 14 has an opening flange 14a which is bent radially outwardly. A disk-like diaphragm 15, a lower partition member 16 and an upper partition member 17 are disposed on the opening flange 14a in a state of being superposed on each other. A buffer assembly 18 formed by connecting a ring-like lower bracket 18a, a dome-like elastic member 18b made of rubber and a disk-like upper bracket 18c is disposed on he upper partition member 17. To the lower bracket 18a of the buffer assembly 18, the opening flange 14a of the mount housing 14 is fixed by a plurality of bolts 19 by being fastened together with the diaphragm 15 and the upper and lower partition members 16 and 17 by these bolts. An O ring 16a is provided between the lower partition member 16 and the upper partition member 17 to maintain a liquid seal therebetween, while an O ring 17a is provided between the upper partition member 17 and the lower bracket 18a to also maintain a liquid seal therebetween.

In the thus-constructed engine mount unit 3, a main fluid chamber 20 is formed between the buffer assembly 18 and the upper partition member 17, and a sub fluid chamber 21 is formed between the lower partition member 16 and the diaphragm 15. The volume of the sub fluid chamber 21 can be changed by virtue of the diaphragm 15. Further, an air chamber 22, which is opened to atmospheric air, is formed between the diaphragm 15 and the mount housing 14. A circular arc groove 23a is formed in an upper surface of the lower partition member 16 coaxially with and axis L of the engine mount. One end of the circular arc groove 23a opens into the main fluid chamber 20 through an opening 23b formed in the upper partition member 17, while the other end of the groove 23a opens into the sub fluid chamber 21 through an opening 23c formed in the lower partition member 16. The groove 23a and the openings 23b and 23c form an orifice 23 which provides a communication between the main fluid chamber 20 and the sub fluid chamber 21. The sectional area and the length of groove 23a in the orifice 23 are selected so that a higher damping effect is achieved particularly when vibrations in a low-frequency range (20 to 40 Hz) are input to the engine mount unit 3, as described later.

A projection 24 which extends through the elastic member 18b is formed on a central portion of an lower surface of the upper bracket 18c of the buffer assembly 18. An injection hole 24a formed in the projection 24 provides a communication between an upper exterior portion of the upper bracket 18c and the interior of the main fluid chamber 20. The injection hole 24a is used to inject a non-compressive fluid such as ethylene glycol into the main and sub fluid chambers 20 and 21. The injection hole 24 is normally closed with a bolt 25 inserted from above. A disk-like stay member 26 is fixed on the upper bracket 18c with a plurality of small bolts 27. The above-mentioned volt 12 to be fixed on the engine 2 is integrally formed on an upper central portion of the stay member 26.

A first magnetic member 31 is fixed to an inner bottom portion of the mount housing 14, and a cylindrical portion 31a is formed on the upper side of the magnetic member 31 in correspondence with the axis L. A permanent magnet, i.e., a ring-like ferrite magnet 33, is bonded to an upper surface of the first magnetic member 31 so as to surround the cylindrical portion 31a. Another magnetic member, i.e., a second ring-like magnetic member 34, is bonded to an upper surface of the ferrite magnet 33. An inner circumferential portion of the second magnetic member 34 faces an outer circumferential portion of the cylindrical portion 31a of the first magnetic member 31, with a predetermined gap formed therebetween. A supporting ring 35 is bonded to an upper surface of the second magnetic member 34 in a determined position. Two dampers 36 formed of two sheets of nonwoven fabric are stretched on inner circumferential portions of the supporting ring 35 while being spaced apart from each other through a predetermined distance. The dampers 36 support a cylindrical yoke 37 which is closed at its top and opened at its bottom. Each damper 36 has a corrugated cross section so as to allow a small extent of movement of the yoke 37 along the axis L while limiting the movement of the yoke 37 in directions perpendicular to the axis L. A moving coil 38 is wound around a lower outer-circumferential portion of the yoke 37. The moving coil 38 and this portion of the yoke 37 are inserted into the above-mentioned gap between the outer circumference of the cylindrical portion 31a of the first magnetic member 31 and the inner circumference of the second magnetic member 24 in such a manner that a predetermined gap is maintained between the yoke 37 or the coil 38 and one of the magnetic members 31 and 34 facing the yoke 37 or the coil 38.

A voice coil 39 provided as an actuator is formed by the first magnetic member (pole piece) 31, the ferrite magnet 33, the second magnetic member (plate) 34 and the yoke 37. If an alternating current is caused to flow through the moving coil 38 in the direct current magnetic field formed by the two magnetic members 31 and 34 and the ferrite magnet 33, the yoke 37 vibrates in the direction along the axis L in accordance with the Fleming's left-hand rule.

A circular communication hole 40 is formed through the upper and lower partition members coaxially with the axis L to provide a communication between the main fluid chamber 20 and the sub fluid chamber 21. A disk-like moving member or plate 41 is disposed in a horizontal attitude in the communication hole 40. An attachement portion 41a projects from a lower central portion of the moving plate 41. The attachment portion 41a faces an attachment portion 37a projecting from an upper central portion of the yoke 37, with a central portion of the diaphragm 15 interposed therebetween. The attachment portion 37a of the yoke 37, the central portion of the diaphragm 15 and the attachment portion 41a of the moving plate 41 are fastened to each other by a bolt 42. Accordingly, when the moving coil 38 is energized as mentioned above, the moving plate 41 vibrates in the communication hole 40 in the direction along the axis L together with the yoke 37. The gap S between the outer circumference of the moving plate 41 and the inner circumference of the communication hole 40 is minimized while the two members 41 and 40 are prevented from contacting each other when the moving plate 41 vibrates. In this embodiment, the gap S is set to a very small value, i.e., about 0.1 to 0.3 mm. By the effect of the viscosity of the non-compressive fluid in the main and sub fluid chambers 20 and 21, therefore, the non-compressive fluid is prevented from passing through the gap S when the moving plates 41 vibrates. It can be considered that, dynamically, the communication hole 40 is closed substantially completely with the moving plate 41.

Figure 19:
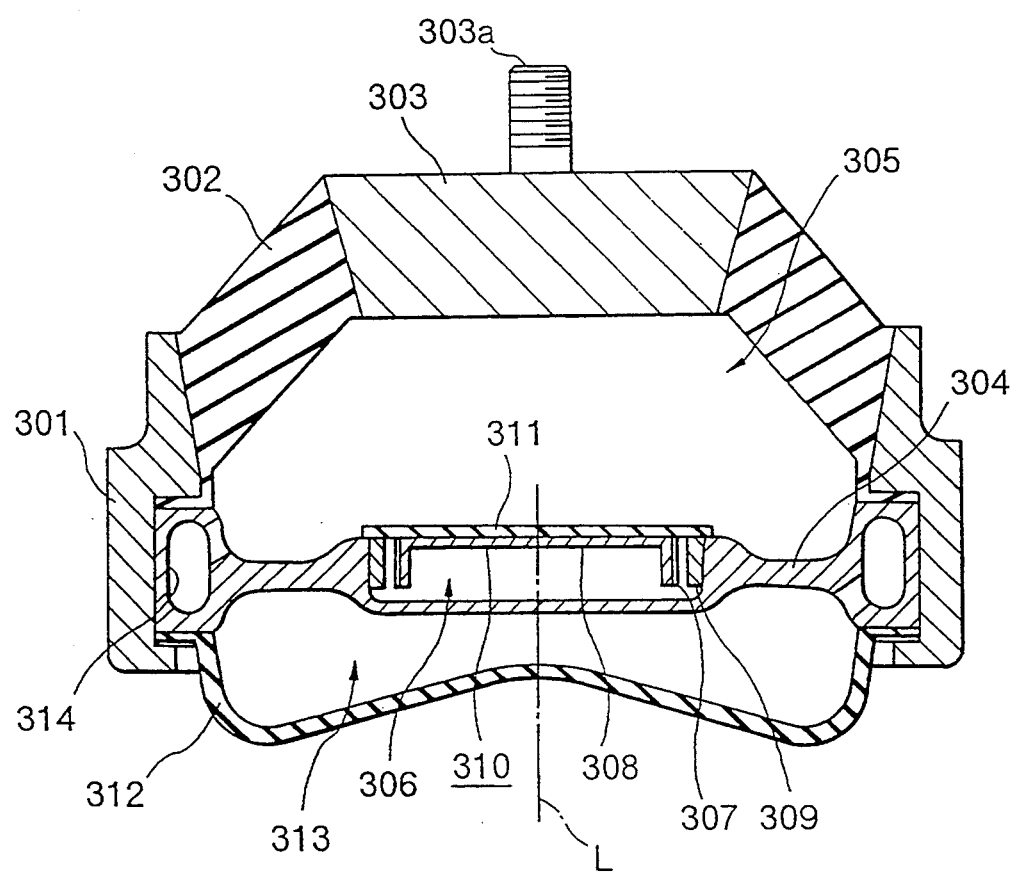
FIG. 19 is a cross-sectional view of a conventional electronically controlled engine mount.

In this embodiment, as described above, the gap S between the outer circumference of the moving plate 41 and the inner circumference of the communication hole 40 is reduced to obtain a certain effect of sealing between the main and sub fluid chambers 20 and 21 by utilizing the viscosity of the non-compressive fluid. Therefore, there is no need to use a sheet-like member 311 (shown in FIG. 19) for maintaining a fluid seal as in the above-described conventional engine mount, and there is no possibility of the vibration of the moving plate 41 being impeded by a member such as the sheet-like member 311. It is therefore possible to smoothly transmit vibrations of the moving plate 41 to the non-compressive fluid in the main fluid chamber 20. Also, the moving plate 41 is reliably displaced along the axis L without being influenced by the sheet-like member 311 or the like. Since at this time the gap between the second magnetic member 34 and the moving coil 38 is not changed, the efficiency of the voice coil 39 can be improved by reducing the gap. It is therefore possible to reduce the size of the voice coil 39 as well as to use a ferrite magnet.

Figure 3:
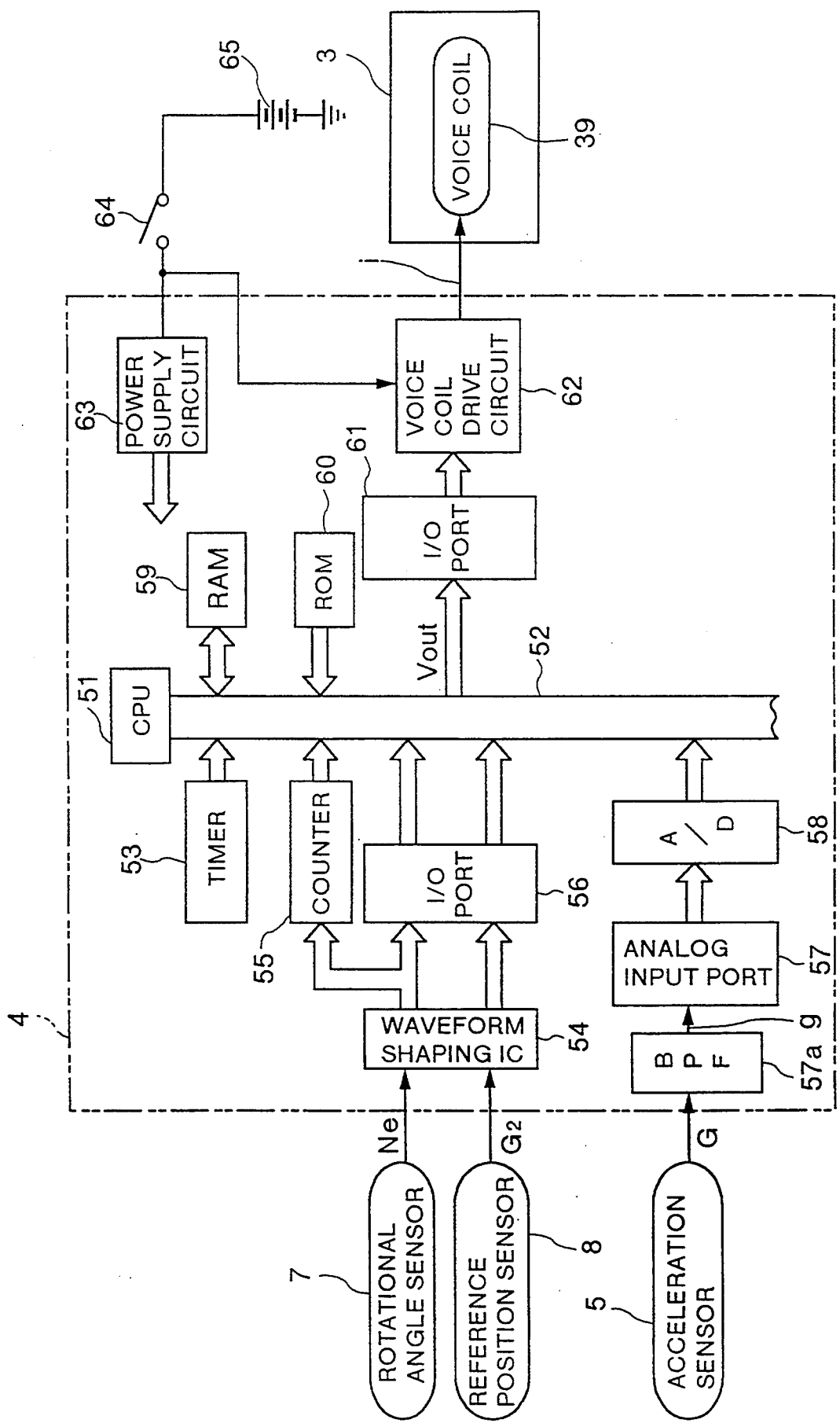
FIG. 3 is a block diagram of the configuration of an electronic control unit (ECU) of the electronically controlled engine mount of the first embodiment of the present invention.

Next, the configuration of the above-mentioned ECU 4 will be described. FIG. 3 is a block diagram of the configuration of the ECU of the electronically controlled engine mount in accordance with the first embodiment of the present invention, and FIGS. 4A to 4D are waveform diagrams of signals used by the ECU of the electronically controlled engine mount in accordance with the first embodiment of the present invention.

The ECU 4 has a central processing unit (CPU) 51, a data bus 52, a timer 53, a waveform shaping integrated cricuit (IC) 54, a counter 55, an I/O port 56, a band-pass filter 57a, an analog input port 57, an A/D converter circuit 58, a random access memory (RAM) 59 for temporarily storing data processed by the CPU 51, a read only memory (ROM) 60 for storing a control program for the CPU 51, an I/O port 61, a voice coil drive circuit 62 and a power supply circuit 63. When the key switch 64 is turned on, electric power is supplied from a battery 65 to the power supply circuit 63 to start the ECU 4.

Figure 4A:
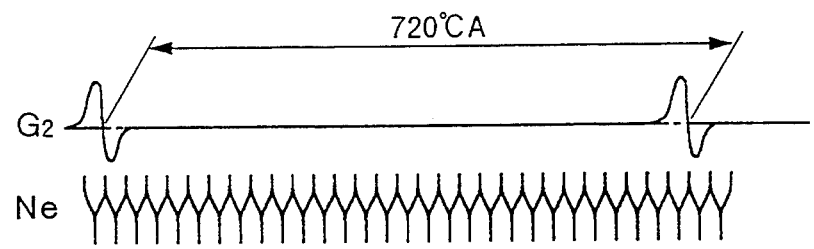
FIGS. 4A, 4B, 4C and 4D are waveform diagrams of signals used by the ECU of the electronically controlled engine mount of the first embodiment of the present invention.
Figure 4B:
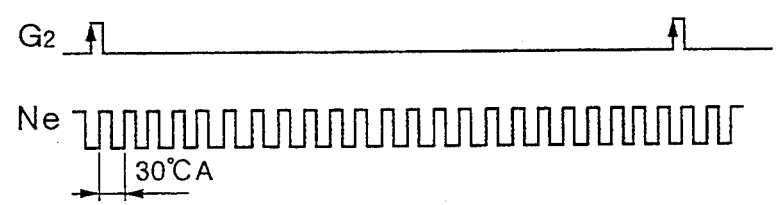
Figure 4C:
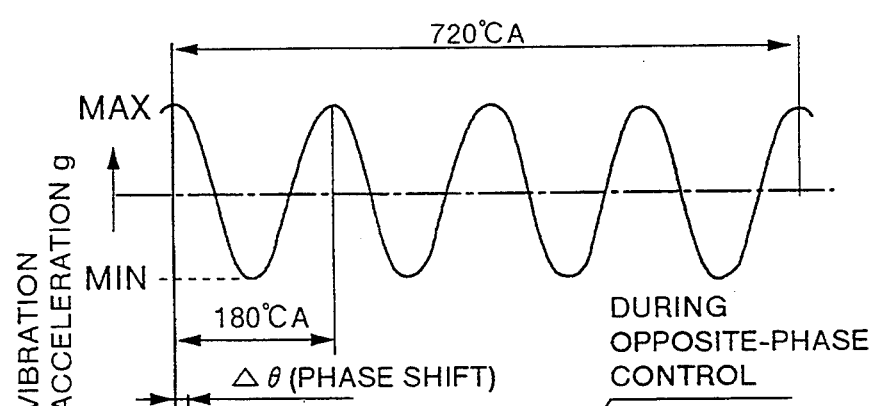

The rotational angle signal Ne from the rotationl angle sensor 7 incorporated in the distributor 6 and the referenceposition signal G2 from the reference position sensor 8 are input to the waveform shaping IC 54 as waveforms such as those shown in FIG. 4A. The waveform shaping IC 54 shapes the signals Ne and G2 into rectangular waves such as those shown in FIG. 4B, and outputs the shaped signals to the data bus 52 through the I/O port 56. The rotational angle signal Ne after waveform shaping is counted by the counter 55 and a counted value is output to the data bus 52. On the other hand, the acceleration signal G from the acceleration sensor 5 is passed through the band-pass filter 57a and is input to the A/D converter circuit 58 as a vibration acceleration g shown in FIG. 4C. The acceleration signal thereby converted from an analog form into a digital form is output to the data bus 52.

Figure 4D:
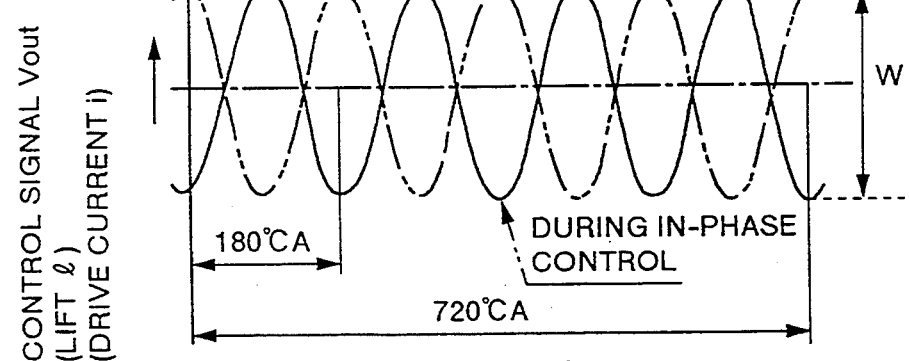

The CPU 51 forms a control signal Vout shown in FIG. 4D on the basis of the input vibration acceleration g and outputs the control signal Vout to the voice coil drive circuit 62 through the I/O port 61. The voice coil drive circuit 62 is supplied with power from the battery 65 and outputs a drivecurrent i proportional to the control signal Vout to the voice coil 39. The moving coil 38 of the voice coil 39 is energized by the drive current i to vibrate the moving plate 41.

Figure 5:
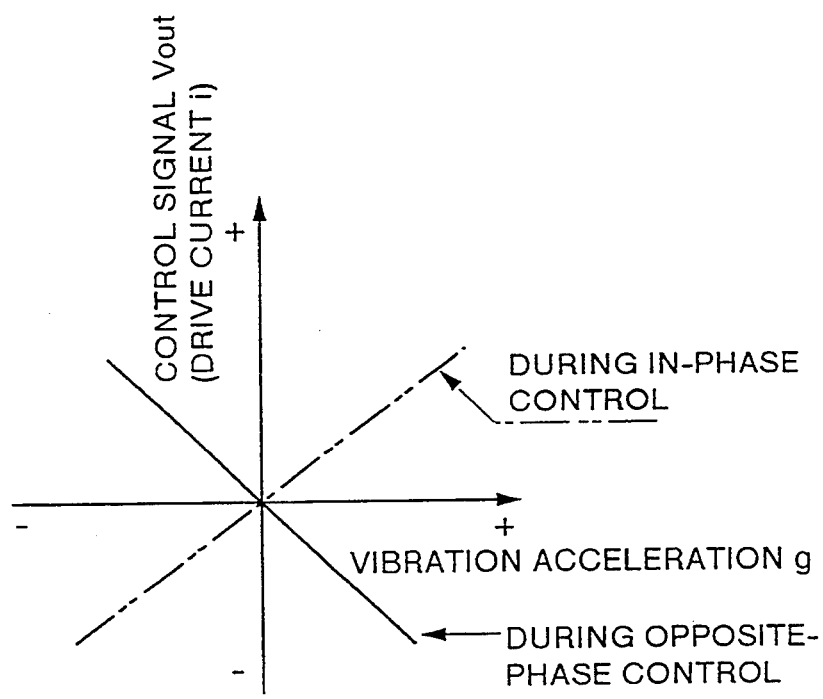
FIG. 5 is a characteristic diagram showing the relationship between a vibration acceleration and a control signal in the electronically controlled engine mount of the first embodiment of the present invention.
Figure 6:
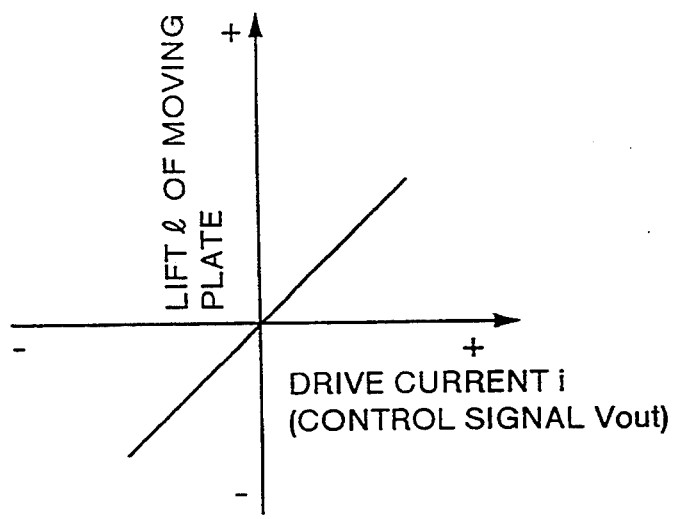
FIG. 6 is a characteristic diagram showing the relationship between a drive current and the lift of a moving plate in the electronically controlled engine mount of the first embodiment of the present invention.

Next, a process in which vibrations are input from the engine 2 and attenuated in the engine mount unit 3 will be described with respect to a case where the engine 2 is a 4-stroke-cycle inline 4-cylinder engine. FIG. 5 is a characteristic diagram showing the relationship between the vibration acceleration and the control signal in the electronically controlled engine mount in accordance with the first embodiment of the present invention, and FIG. 6 is a characteristic diagram showing the relationship between the drive current and the lift of the moving plate in the electronically controlled engine mount in accordance with the first embodiment of the present invention.

In a 4-cycle-stroke inline 4-cylinder engine, four explosion strokes are made during two revolutions (720° CA), that is, one explosion stroke is made in the period of 180° CA. Therefore, vibration caused by explosions in the engine 2 (primary vibration) can be approximated as a waveform similar to a sine wave and having a cycle corresponding to 180° CA. This vibration is transmitted to the vehicle body 1 through the engine mount unit 3 and is detected by the acceleration sensor 5 along with other vibrations due to the traveling operation of the vehicle and other causes. The band-pass filter 57a passes only signal components in the frequency range of 10 to 200 Hz resulting from explosions in the engine 2 in the acceleration signal G from the acceleration sensor 5. The vibration acceleration g of FIG. 4C thereby obtained is input to the CPU 51. It is assumed here that at the maximum of the vibration acceleration g shown in FIG. 4C, a vibration stroke in a compressing direction is input from the engine 2 to the engine mount unit 3 to downwardly bend the elastic member 18b, and that at the minimum of the vibration acceleration g, a vibration stroke in an expanding direction is input to the engine mount unit 3 to upwardly bend the elastic member 18b.

The ECU 4 executes an opposite-phase control of reducing the dynamic spring constant of the engine mount unit 3 to shut off vibrations from the engine 2 at the engine mount unit 3 during steady operation of the engine 2, and executes an equal-phase control of increasing the dynamic spring constant of the engine mount unit 3 to limit an engine shake during transient operation of the engine, for example, at the time of abrupt acceleration or deceleration, starting or bracking.

During execution of the opposite-phase control, the control signal Vout of the CPU 51 is formed so as to be inversely proportional to the vibration acceleration g in conformity with a characteristic represented by a solid line in FIG. 5. The drive current i is determined by the voice coil drive circuit 62 so as to be proportional to the control signal Vout. The voice coil 39 has a characteristic such as that shown in FIG. 6, i.e., such as to increase the lift 1 of the moving plate 41 in proportion to the drive current i flowing through the moving coil 38. Therefore, the lift 1 of the moving plate 41 is controlled on the basis of the waveform having a cycle corresponding to 180° CA and generally in the form of a sine wave so that its resulting phase is always opposite to that of the vibration acceleration g, as indicated by a solid line in FIG. 4D. Since the voice coil 39 responds well and is well known, the drive current i can be controlled on the basis of the vibration acceleration g up to an upper limit (about 200 Hz) of the frequency range of primary vibration of the engine 2.

In this manner, the moving plate 41 is downwardly displaced when the elastic member 18b is downwardly bent by a vibration stroke input from the engine 2. Accordingly, the increase in the pressure in the main fluid chamber 20 caused by the vibration input in the compressing direction is limited and the dynamic spring constant of the engine mount unit 3 is greatly reduced. As a result, the vibration from the engine 2 is reliably shut off at the engine mount unit 3, the rate of transmission of vibration through the engine mount is greatly reduced and low-frequency noise is effectively reduced. The vibration of the moving plate 41 caused in this case is also input to the non-compressive fluid in the sub fluid chamber 21. However, the sub liquid chamber 21 does not impede the vibration of the moving plate 41, since a change in the volume of the sub fluid chamber 21 is allowed by bending of the diaphragm 15.

During execution of the equal-phase control, the control signal Vout of the CPU 51 is formed so as to be proportional to the vibration acceleration g in conformity with a characteristic represented by a doube-dot-dash line in FIG. 5. Since the lift 1 of the moving plate 41 caused by the voice coil 39 is increased in proportion of the drive current i, the lift 1 of the moving plate 41 is controlled on the basis of the waveform having a cycle corresponding to 180° CA and generally in the form of a sine wave so that its resulting phase is always equal to that of the vibration acceleration g, as indicated by a double-dot-dash line in FIG. 4D.

That is, when the elastic member 18b is downwardly bent by a vibration stroke input from the engine 2, the moving plate 41 is upwardly displaced. Accordingly, the pressure in the main fluid chamber 20 is increased more sharply and the dynamic spring constant of the engine mount unit 3 is largely increased, thereby limiting an engine shake.

In each of the above-described opposite-phase and in-phase controls, the waveform of the drive curent i (the lift 1 of the moving plate 1) is controlled so as to be delayed from the waveform of the vibration acceleration g by a predetermined delay time $\Delta\theta$, and so that the amplitude W of the drive current i is reduced if the engine speed N is increased. That is, the delay time $\Delta\theta$ is required because there is a need to advance the drive current i relative to the vibration aceleration g actually generated in the vehicle body 1 by a value selected according to a delay in the response of the voice coil 39 and other factors. The drive current i is substantially advanced by delay adjustment in waveform shaping. The suitable delay time $\Delta\theta$ changes with the engine speed N and is therefore set according to the engine speed N, as in the case of the amplitude W of the drive current i. The amplitude W of the drive current i is reduced in order to reduce the displacement of the moving plate 41 with respect to higher rotational speeds of the engine 2, because if the rotational speed of the engine 2 is higher, the amplitude of the vibration acceleration g is reduced so that the amount of bending of the elastic member 18b of the engine mount unit 3 is smaller, as is well known.

If the vibration transmission rate is reduced through the rotational speed range of the engine 2 only by the opposite-phase control of the moving plate 41, it is necessary to set a substantially large value of the lift 1 of the moving plate 41 (the amplitude W of the drive current i) particularly in a range where the frequency of the vibration acceleration g is 40 Hz or lower (or the engine speed N is 1,200 rpm or lower). Accordingly, the power consumption of the voice coil 39 mut be increased. In the engine mount unit 3 of this ebodiment, the characteristics of the orifice 23 are set with respect to vibrations in a low frequency range (20 to 40 Hz), as mentioned above. Therefore, the non-compressive fluid in the main and sub fluid chambers 20 and 21 flows reciprocatingly therebetween by passing through the orifice 23 to acheive a vibration damping effect. That is, in the low speed range from idling speed to 1,200 rpm, vibration damping of the moving plate 41 is assisted by the orifice 23, so that a reduction in the vibration transmission rate can be achieved. Accordingly, it is not necessary to increase the amplitude W of the drive current i particularly largely, and the power consumption of the voice coil 39 in the low frequency range can be reduced.

Figure 7:
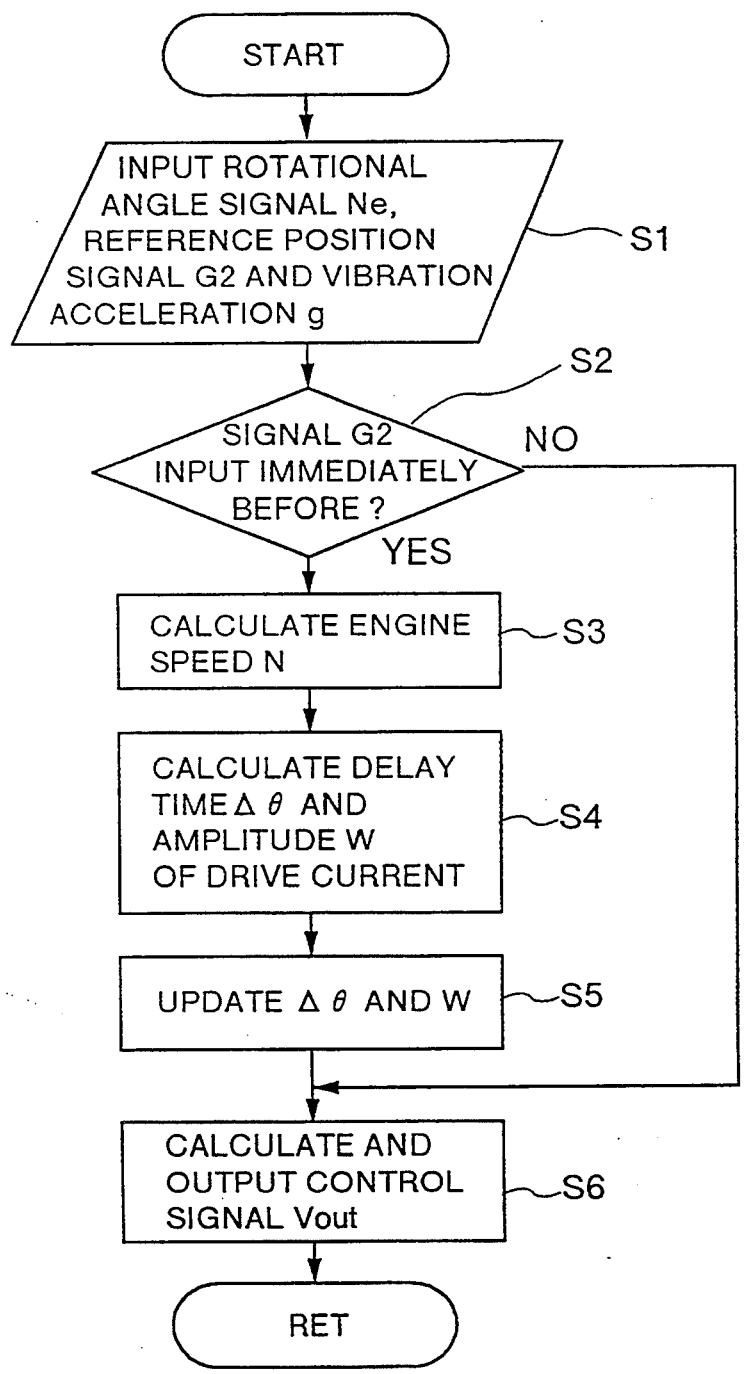
FIG. 7 is a flowchart of processing procedure processing in a CPU used in the electronically controlled engine mount of the first embodiment of the present invention.

Next, processing of the CPU 51 when the above-described opposite-phase control and in-phase control are executed will be described. FIG. 7 is a flowchart shwing a procedure of processing of the CPU in the electronically controlled engine mount in accordance with the first embodiment of the present invention.

The routine of FIG. 7 is executed at predetermined time intervals. In step S1, the rotational angle signal Ne from the rotatioanl angle sensor 7 and the reference position signal G2 from the reference position sensor 8 are input to the CPU 51 through the waveform shaping IC 54, and the acceleration signal G from the acceleration sensor 6 is also input as vibration acceleration g to the CPU 51 through the band-pass filter 57a. In step S2, a determination is made as to whether the reference position signal G2 was input immediately before the present time. If YES, the process proceeds to step S3 and the present engine speed N is calculated from the rotational angle signal Ne. In step S4, the delay time $\Delta\theta$ and the amplitude W of the drive current i are calculated from %he engine speed N on the basis of a map stored in the ROM 60. In step S5, the delay time $\Delta\theta$ and the amplitude W already stored in the RAM 59 are updated to the newly calculated values. Thereafter, in step S6, the value of the control signal Vout is calculated from the prevent value of the vibration acceleration g on the basis of the characteristics shown in FIG. 5 while being corrected according to the delay time $\Delta\theta$ and the amplitude W of the drive current i, and is output to the voice coil drive circuit 62. That is, the control signal Vout at this time is set in inverse proportion to the vibration acceleration g if the present control is opposite-phase control, or in proportion to the vibration acceleration g if the present control is in-phase control.

If it is determined in step S2 that no reference position signal G2 was input immediately before the present time, the process proceeds to step S6 to perform processing for calculating the control signal Vout, correcting the same by using the delay time $\Delta\theta$ and the amplitude W stored in the RAM 59 and outputting the calculated control signal Vout. That is, the delay time $\Delta\theta$ and the amplitude W of the drive current i are updated to optimal values each time the reference position signal G2 is input.

On the basis of the control signal Vout formed in this manner, the drive current i having a waveform such as that shown in FIG. 4D is output from the voice coil drive circuit 62 to the voice coil 39 to energize the same, thereby vibrating the moving plate 41.

In the electronically controlled engine mount of this embodiment, as described above, the main fluid chamber 20 to which vibrations from the engine 2 are input and the sub fluid chamber 21 the volue of which can be changed by virtue of the diaphragm 15 are sectioned with partition members 16 and 17, the moving plate 41 is disposed in the communication hole 40 formed in the partition members 16 and 17 so that a small gap S is formed between the moving plate 41 and the inner surface of the hole 40, and the moving plate 41 is caused by the voice coil 39 to vibrate in the direction along the axis L of the engine mount unit 3.

Therefore, the non-compressive fluid in the main and sub fluid chambers 20 and 21 is prevented from passing through the gap S when the moving plate 41 vibrates, because of its viscosity. In this manner, a reliable fluid sealing is made between the two fluid chambers 20 and 21. There is therefore no need for a fluid sealing member such as the sheet-like member 311 described above with respect to the conventional art. Accordingly, there is no possibility of the vibration of the vibrating plate 41 being impeded by the sheet member 311 or the like and vibrations can be smoothly transmitted from the moving plate 41 to the non-compressive fluid in the main fluid chamber 20. It is possible to control the dynamic spring constant always suitably in each of opposite-phase control and in-phase control so that vibrations from the engine 2 can be reliably shut off or engine shakes can be reliably reduced.

Also, since the moving plate 41 can be reliably displaced upwardly along the axis L without being influenced by the sheet member 311 or the like, the gap between the second magnetic member 34 and the moving coil 38 can be reduced to improve the efficiency of the voice coil 39. Accordingly, the size of the voice coil 39 can be reduced and a low-price ferrite magnet can be adopted for the voice coil 39. As a result, the overall size of the engine mount unit 3 can be reduced.

The electronically controlled engine mount of this embodiment has other various advantages, which will be described by being itemized below.

1) As is apparent from FIG. 2, the arrangement in which the moving plate is disposed in the communication hole 40 in the partition members 16 and 17 separating the main and sub fluid chambers 20 and 21 has an improved space efficiency in comparison with an arrangement in which the moving plate 41 is disposed in other places, for example, in elastic member 18b or the like. Also for this reason, the size of the engine mount unit 3 can be reduced.

2) The voice coil 39 is provided in the air chamber 22 under the sub fluid chamber 21, and the moving plate 41 in the communication hole 40 is vibrated by the voice coil 39 through the attachment portions 37a and 41a. Therefore, there is no risk of the wiring connecting the voice coil 39 and the ECU 4 being short-circuited when immersed in the non-compressive fluid, so that the reliability of the operation of the voice coil 39 can be improved.

3) The injection hole 24a for injecting the non-compressive fluid into the main and sub fluid chambers 20 and 21 is formed in an upper portion of the engine mount unit 3. The non-compressive fluid can therefore be injected very easily.

4) Because the yoke 37 of the voice coil 39 is supported by two dampers 36, the yoke 37 and the cylindrical portion 31a of the first magnetic member 31 can be maintained in an improved coaxial alignment, and the gap between the second magnetic member 34 and the moving coil 38 can be further reduced to improve the efficiency.

5) Because a central portion of the diaphragm 15 is pinched between the attachment portion 37a of the yoke 37 and the attachment portion 41a of the moving plate 41, the diaphragm 15 can always be bent in the same direction as the moving plate 21 to forcibly change the volume of the sub fluid chamber 21 when the moving plate 41 vibrates. Accordingly, the vibration of the moving plate 41 can be prevented more reliably from being impeded by the non-compressive fluid in comparison with an arrangement in which a change in the volume of the sub fluid chamber 21 is allowed only by utilizing the elasticity of the diaphragm 15.

6) The opposite-phase control and the in-phase control are performed according to the operating conditions of the engine 2, that is, the opposite-phase control is executed during steady operation while the in-phase control is performed during transient operation. Therefore, the engine mount of the present invention has an advantage of limiting engine shakes as well as the same advantage of vibration isolation of the engine 2 as that of the conventional engine mount.

7) The fact that the amplitude of the vibration acceleration g is reduced with an increase in the engine speed N has been taken into consideration. The amplitude W of the drive current i of the voice coil 39 is controlled so as to be continuously reduced according to the reduction of the amplitude of the vibration acceleration g. That is, the lift 1 of the moving plate 41 is finely controlled in correspondence with the actual amount of bending of the elastic member 18b of the engine mount unit 3. Therefore, the dynamic spring constant can be controlled more accurately and the power consumption can be reduced by reducing the amplitude W of the drive current i in a high engine speed range. This effect can be obtained by a simple control of only changing the amplitude W of the drive current i in this manner.

8) In a low-frequency range where the frequency of vibration acceleration g is 40 Hz or lower, the orifice 23 acts to assists the vibration damping operation of the moving plate 41. It is not necessary to increase the lift 1 of the moving plate 41 (the amplitude W of the drive current i) particularly largely, and the power consumption of the voice coil 39 in the low-frequency range can be remarkably reduced. Also, since the necessary lift 1 of the moving plate 41 is not large, the stroke of the voice coil 39 can be reduced so that the voice coil 39 is reduced in size and improved in durability.

Figure 8A:
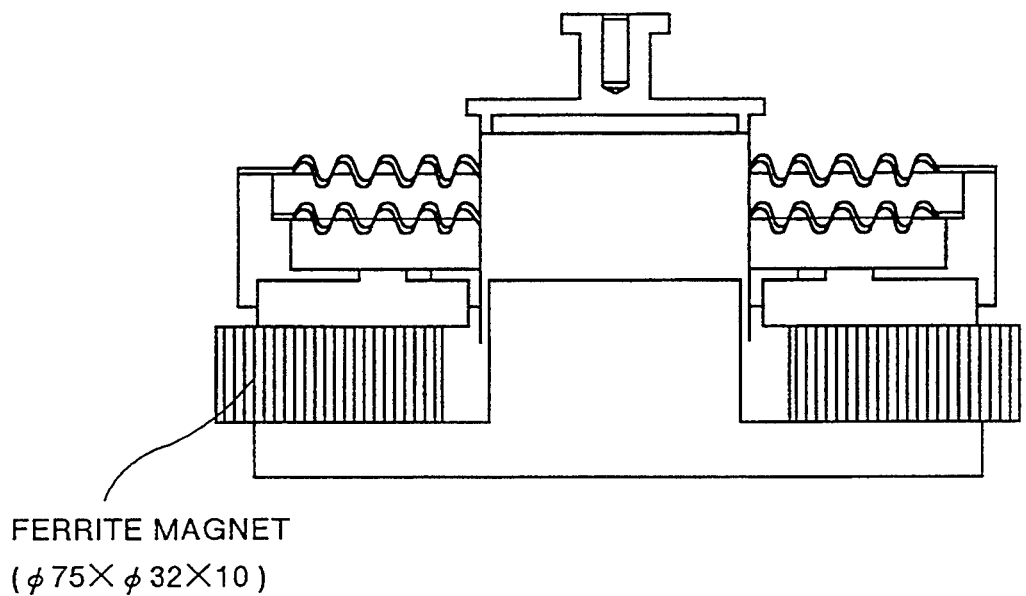
FIG. 8A is a cross-sectional view of a voice coil used in the engine mount unit of the electronically controlled engine mount of the first embodiment of the present invention.
Figure 8B:
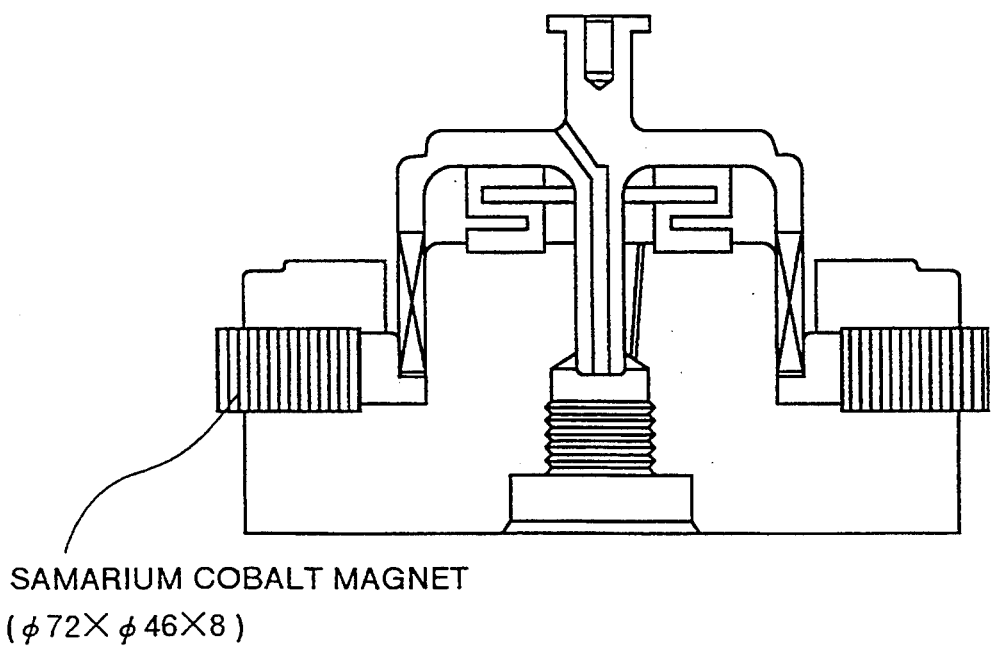
FIG. 8B is a cross-sectional view of a conventional voice coil.
Figure 9:
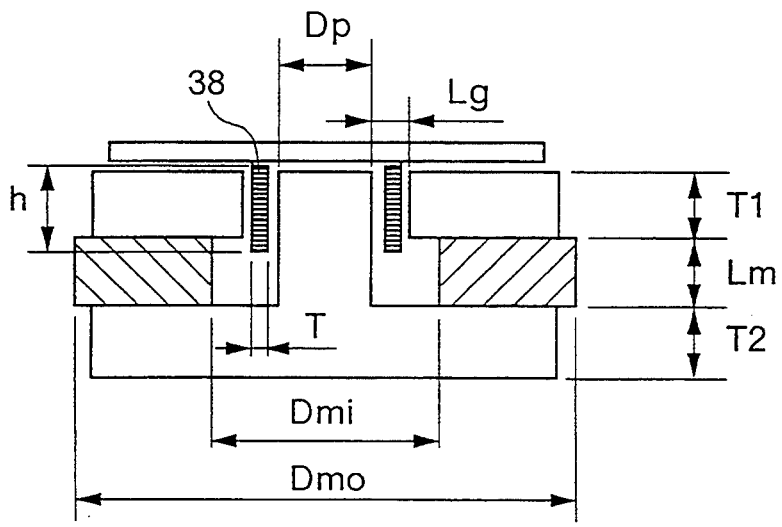
FIG. 9 is a diagram of dimensions for the voice coil used in the engine mount unit of the electronically controlled engine mount of the first embodiment of the present invention.

The features of the voice coil of the electronically controlled engine mount of this embodiment will be described in more detail with reference to FIG. 8A. FIG. 8B illustrates a conventional voice coil for comparison. FIG. 9 is a diagram showing the size of the voice coil shown in FIG. 8A and other factors relating to a maximum output generated by the voice coil, which will be explained below.

The voice coil used as an actuator for active control of the electronically controlled engine mount of this embodiment is not a voice coil such as that required for audio speakers and having low-sound-distortion characteristics. In the case of an engine mount voice coil, an output that is particularly large with respect to the size of the voice coil is required to operate the moving member against the fluid pressure in the main fluid chamber of the engine mount.

In the conventional art, therefore, there is a design concept of using a rare earth magnet such as a samarium cobalt magnet or a neodymium magnet having a high residual magnetic flux density to form a direct current magnetic field for a voice coil. However, rare earth magnets are expensive and not suitable for practical use. For this reason, according to the present invention, an optimal voice coil design has been made by using a low-priced ferrite magnet instead of such a rare earth magnet and by restudying the magnetic circuit of the voice coil.

The voice coil output F is given by the following equation:

$$F = Bg \cdot i \cdot N \cdot (Dp + Lg) \cdot \pi \quad (1)$$

where Bg is a gap magnetic flux density, i is the drive current, N is the number of effective coil turns, Dp is the diameter of the center pole, and Lg is the gap length.

The gap magnetic flux density Bg is given by the following equation:

$$Bg = (Am \cdot Br)/\{Ag \cdot \sigma \cdot (1 + \mu\gamma Pc)\} \quad (2)$$

where Am is the sectional area of the magnet, Ag is the gap area $[\pi(Dp+Lg)T1]$, $\sigma$ is a leakage coefficient, Br is a residual magnetic flux density of the magnet, $\mu\gamma$ is a recoil magnetic permeability $\cong 1.07$, and Pc is a permeance coefficient.

The permeance coefficient Pc is given by the following equation:

$$Pc = (Lm/Am) \cdot (Ag/Lg) \cdot (\sigma/f) \quad (3)$$

where Lm is the thickness of the magnet and f is a magnetomotive force loss coefficient $\cong 1.1$.

Figure 10:
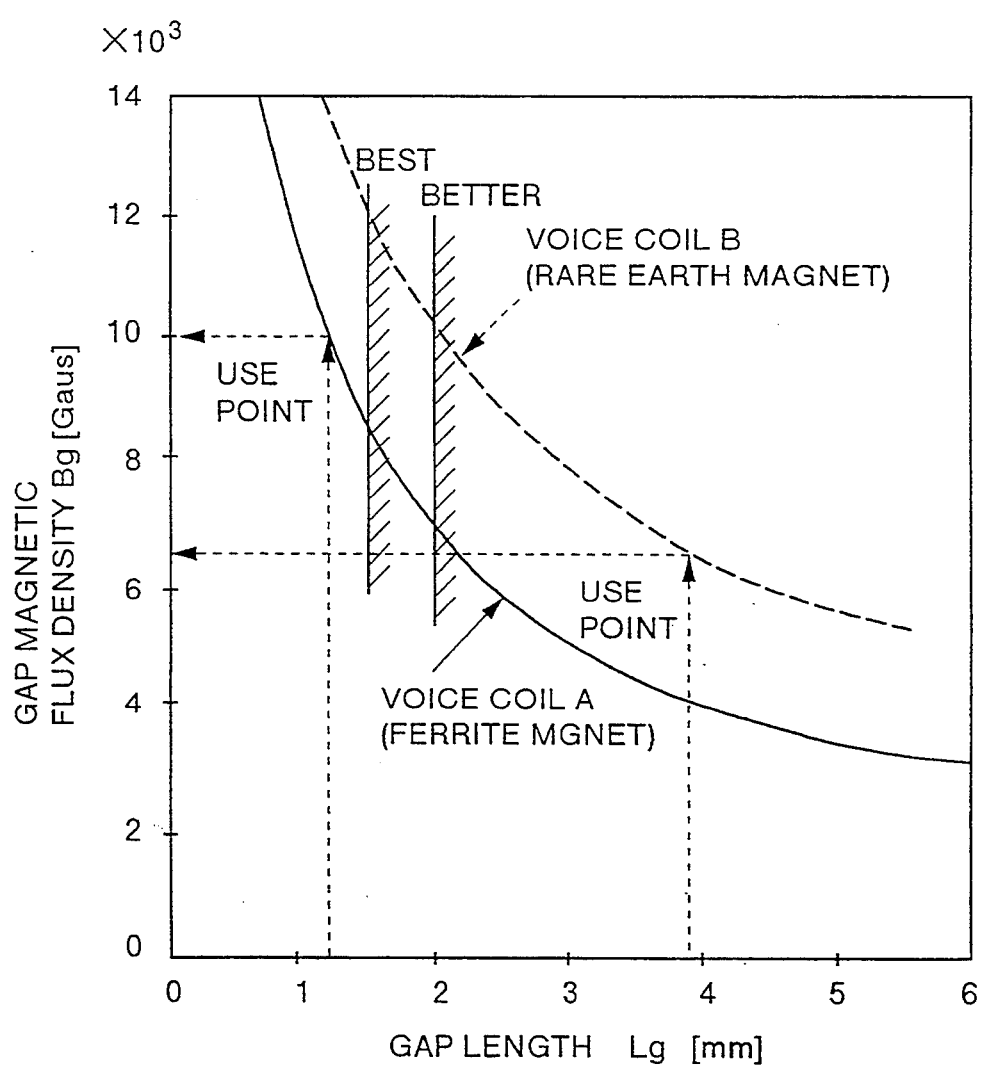
FIG. 10 is a characteristic diagram showing the relatioship between the gap magnetic flux density and the gap length of the voice coil.

From equations (2) and (3), the gap magnetic flux density Bg (gauss) is expressed in a relationship with the gap length Lg (mm) and is represented by a curve in a characteristic diagram such as that shown in FIG. 10.

Next, the difference between this embodiment and the conventional engine mount and advantages of this embodiment over the conventional engine mount will be described and itemized below on the basis of Table 18 showing specific values of voice coils A and B and equations (1) to (3).

i) The size of the magnet was maximized within an allowable range. That is, the magnet for the voice coil A was increased in size in comparison with the magnet of the voice coil B so as to increase the sectional area Am in equation (2), that is, the former has a size of $\phi 75 \times \phi 32 \times 10$ while the latter has a size of $\phi 72 \times \phi 46 \times 8$.

ii) To achieve a large gap magnetic flux density Bg even though a ferrite magnet having a smaller residual magnetic flux density Br was used, the gap length Lg was reduced from 3.9 mm, i.e., that of the voice coil B, to half or less, i.e., 1.16 mm. Referring to FIG. 10, a samarium cobalt magnet having a residual magnetic flux density Br=10,400 gauss was used for the voice coil B. The gap magnetic flux density Bg of this magnet is 6,500 gauss since the gap length Lg is large, i.e., 3.9 mm. In contrast, a ferrite magnet having a residual magnetic flux density Br=4,200 gauss was used for the voice coil A. The gap magnetic flux density Bg of this magnet is large, i.e., 10,000 gauss in accordance with equations (2) and (3) since the gap length Lg is small, i.e., 1.16 mm.

In the characteristic diagram of FIG. 10, the characteristics of the magnets are represented by curves rising upwardly toward the left-hand side of the diagram. As shown in this characteristic diagram, even if a ferrite magnet having a small residual magnetic flux density Br as shown in Table 18 is used for the voice coil A, the same output as that of the voice coil B using a samarium cobalt magnet having a large residual magnetic flux density Br can be generated by reducing the gap length Lg.

iii) The thickness T1 of the top plate of the voice coil A was reduced to 4.5 mm at which the magnetic flux density in the top plate was saturated, while the thickness T1 of the top plate of the voice coil B was set to 5.4 mm.

iv) The diameter d of the conductor of the voice coil A was reduced from 0.5 mm, i.e., that of the voice coil B conductor, to 0.16 mm, and the number of coil layers was reduced from 5 to 2. The coil thickness T was thereby reduced from 2.45 mm to 0.30 mm, so that the gap length Lg could be reduced. If the sectional shape of the coil conductor is changed from a circular shape to a rectangular shape, the gap can be further reduced while the same sectional area is maintained.

(v) In the case of an engine mount, there is no problem due to the occurrence of vibration distortions, which are considerable in the case of a speaker, while a large voice coil output is required. Therefore, the coil height h was set to a small value, i.e., 12.3 mm in the voice coil B and 7.7 mm in the voice coil A (an amplitude of about 3 mm may suffice for an engine mount actuator), and the number of coil turns N could be reduced from 160 to 81. Consequently, the maximum allowable current I could be set to the same value, while the diameter d of the coil conductor was reduced.

Table 18 also shows results of the selection of these factors as comparison between the performances of the voice coils. As shown in Table 18, the volume of the magnet for the voice coil A is about twice as large as that of the magnet the voice coil B, but the specific gravity of the former is about ½ of that of the latter. As a result, the weights of the two magnets are each about 200 g and substantially equal to each other. At present, the ratio of the prices of the magnet materials is (ferrite)/(samarium cobalt)≅1/50, that is, the price of the ferrite is about 1/50 if that of samarium cobalt is 1. Therefore, it is very advantageous in terms of price to use ferrite as the magnet material.

Thus, the gap length in the electronically controlled engine mount of this embodiment can be reduced to 1.5 mm or less by setting the relating factors as described in (i) to (v). An optimal value of the gap magnetic flux density Bg is more than 8,000 gauss and an optimal value of the gap length Lg is accordingly less than 1.5 mm. However, since a target output can be obtained when the gap magnetic flux density of the voice coil B is more than 6,500 gauss, the gap length Lg may be accordingly less than 2.0 mm. Therefore, even if a ferrite magnet or the like having a smaller residual magnetic flux density is used, a sufficiently large gap magnetic flux density can be obtained and a force large enough to operate the moving member so as to sufficiently absorb engine vibrations can be obtained while the size of the voice coil is limited within the range allowable in the engine mount. That is, the electronically controlled engine mount of this embodiment can be provided by forming the voice coil by using a ferrite magnet which is low-priced and useful as a commodity.

Figure 11:
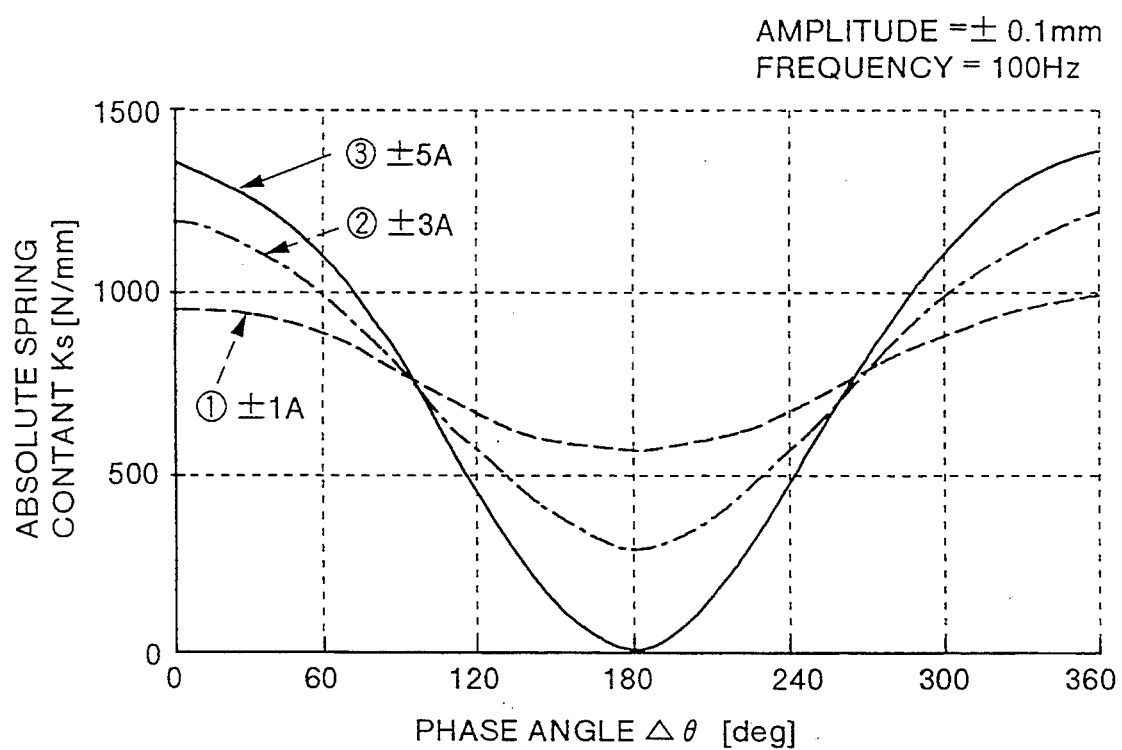
FIG. 11 is a characteristic diagram showing the relationship between the phase angle and the absolute spring constant in the electronically controlled engine mount of the first embodiment of the present invention.

The features of the electronically controlled engine mount of this embodiment will be described in detail on the basis of experimental data. FIG. 11 is a diagram showing characteristics of the electronically controlled engine mount measured when the engine mount was vibrated at an amplitude of ±0.1 mm and at a frequency of 100 Hz. An absolute spring constant Ks (N/mm) was measured by setting different values ①±1A, ②±3A, ③±5A of a parameter, i.e., a peak current value Ip of the alternating current supplied to the voice coil 39, and by changing the phase angle $\Delta\theta$ (deg.) between the vibration applied to the engine mount and the current supplied to the voice coil 39. When the phase angle $\Delta\theta$ is at such a value that the current supplied to the coil and the vibration applied to the engine mount are in phase opposition to each other, that is, the phase of the current is shifted by about 180° CA from that of the vibration, the absolute spring constant is maximized. When the current and the vibration are substantially in phase with each other, the absolute spring constant is maximized. If the peak current value Ip of the alternating current supplied to the voice coil 39 is larger, the absolute spring constant Ks varies more largely. However, the power consumption is increased if the leak current value Ip is larger. Therefore, the minimum peak current value Ip at which the absolute spring constant Ks is substantially zero is selected.

Figure 12:
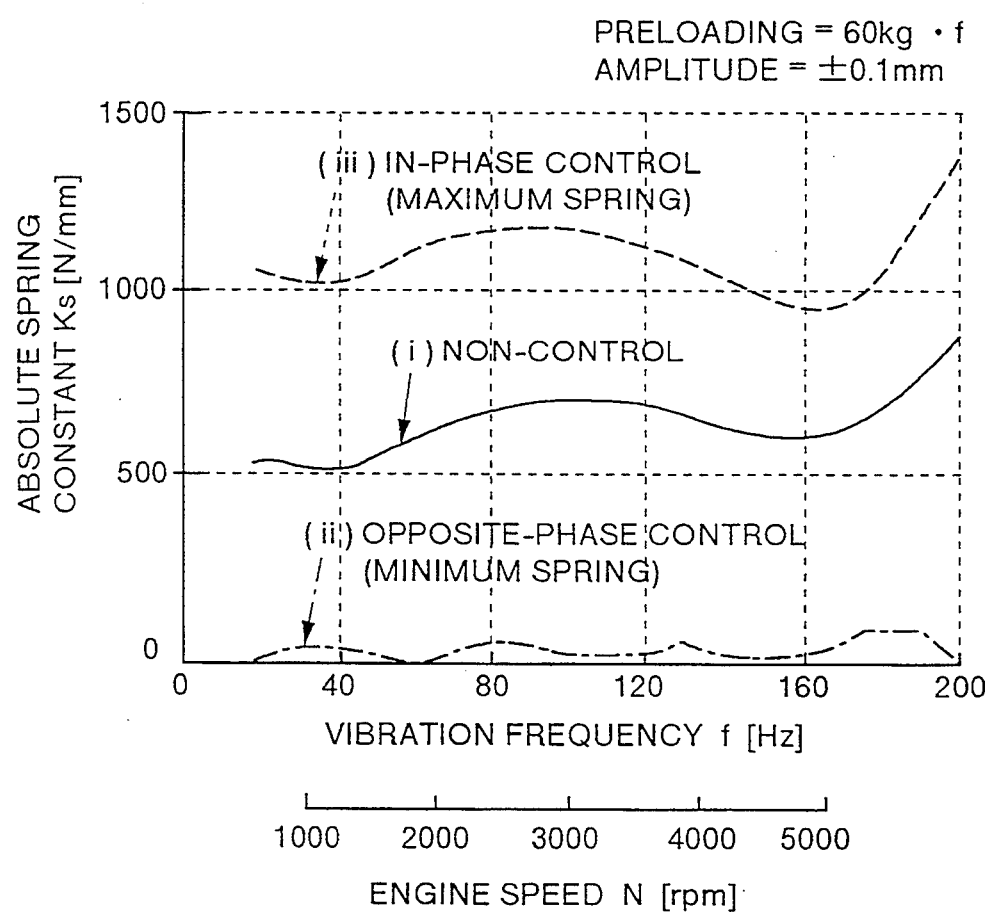
FIG. 12 is a characteristic diagram showing the relationship between the vibration frequency and the absolute spring constant in the electronically controlled engine mount of the first embodiment of the present invention.

FIG. 12 shows values of the absolute spring constant Ks (N/mm) measured with respect to the frequency f (Hz) of vibrations generated at the engine speed N (rpm) while the operation was changed between (i) non-control, (ii) opposite-phase control (minimum spring), and (iii) in-phase control (maximum spring). In (ii) opposite-phase control, a low spring having a low spring constant such that the absolute spring constant was substantially zero through the range of 20 to 200 Hz could be set. In (iii) opposite-phase control, a high spring having a high spring constant about twice as large as that in the case of (i) non-control could be set.

Figure 13:
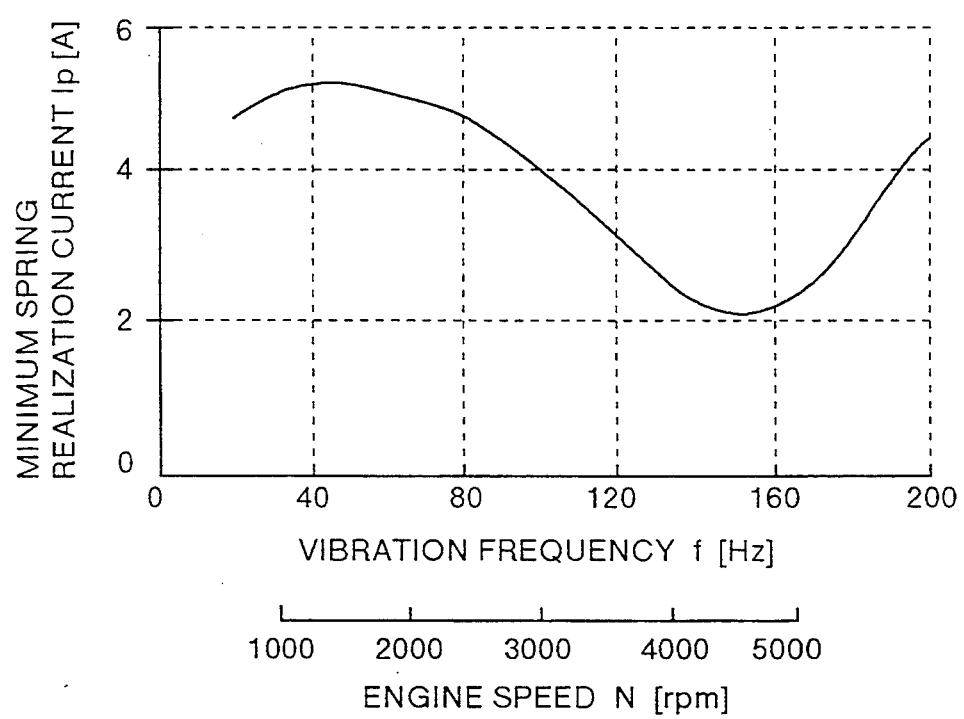
FIG. 13 is a characteristic diagram showing the relationship between the vibration frequency and the minimum spring realization current in the electronically controlled engine mount of the first embodiment of the present invention.
Figure 14:
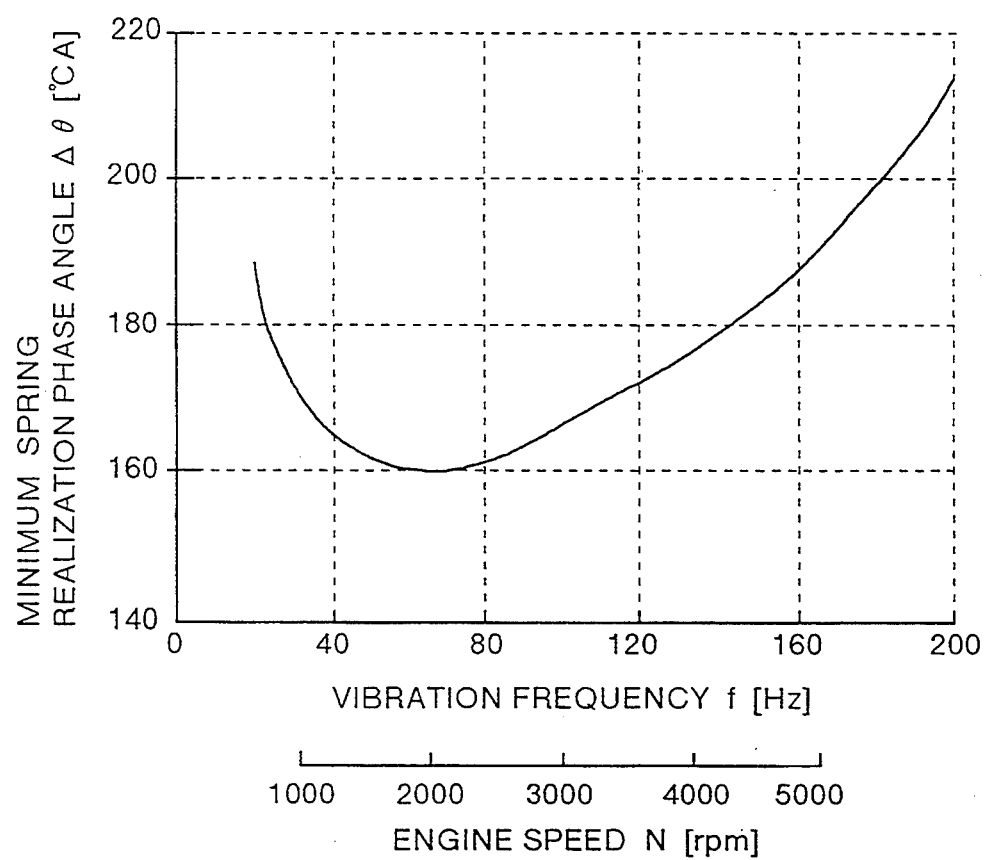
FIG. 14 is a characteristic diagram showing the relationship between the vibration frequency and the minimum spring realization phase angle in the electronically controlled engine mount of the first embodiment of the present invention.

FIG. 13 shows a minimum spring realization current Ip (A) which is a peak current value of the alternating current supplied to the voice coil 39 at which a minimum spring constant is realized with respect to the frequency f (20 to 200 Hz) of vibrations generated at the engine speed N (rpm), and FIG. 14 shows a minimum spring realization phase angle $\Delta\theta$ (°CA) at which a minimum spring constant is realized. The minimum spring realization current Ip shown in FIG. 13 is basically larger at lower frequencies, but it is also increased at about 200 Hz. The minimum spring realization phase angle $\Delta\theta$ shown in FIG. 14 is represented by a curve about 180° CA. It is considered that this variation is due to a distortion of the vibration system (electric mechanical systems).

Thus, the minimum spring realization current Ip and the minimum spring realization phase angle $\Delta\theta$ which provide a minimum spring constant varies with respect to the vibration frequency f. For an optimal control of the engine mount, therefore, it is necessary to experimentally obtain optimal values of Ip and $\Delta\theta$ at each value of vibration frequency f. In this embodiment of the present invention, values of the minimum spring realization current Ip and the minimum spring realization phase angle $\Delta\theta$ which provide minimum spring constants with respect to certain engine speeds N (for example, at intervals of 200 rpm) are previously stored as map data in the ROM 60 in the ECU 4, as shown in FIG. 15, and the values Ip and $\Delta\theta$ to be selected at a certain engine speed N are calculated by interpolation in step S4 of the flowchart of FIG. 7. That is, Ipi and Ipi+1, and $\Delta\theta$i and $\Delta\theta$+1 corresponding to two higher and lower engine speeds closest to the actual engine speed N among the engine speeds stored in the map shown in FIG. 15 are selected and the desired Ip and $\Delta\theta$ are calculated by interpolation.

In the electronically controlled engine mount of this embodiment, as described above, an optimal phase current value and an optimal phase angle selected according to the frequency f of primary vibrations caused by engine explosions can be input to the voice coil 39. Therefore, the absolute spring constant can be set 0 while the power consumption is minimized through the range of frequency f (20 to 200 Hz) corresponding to the entire operating range (600 to 6,000 rpm) of the engine operating range of the engine, whereby vibrations and noise, including idling vibrations and other low-frequency noise, can be markedly reduced. Moreover, values of the current value Ip and the phase angle $\Delta\theta$ which provide maximum spring constants as well as those providing minimum spring constants are previously stored as map data in the ROM 60 in the ECU 4, and engine shakes can be reduced by using these values. Also in this respect, the engine mount of the present invention is practically advantageous.

As described above, the electronically controlled engine mount of this embodiment of the present invention has the main and sub fluid chambers 20 and 21 provided between the vehicle body 1 and the engine 2, having a non-compressive fluid enclosed therein and capable of changing its volume by vibrations input from the engine 2, the sub fluid chamber 21 communicating with the main fluid chamber 20 through and orifice 23 opening. In this engine mount, a moving plate formed of the moving plate 41 disposed at one end of the main fluid chamber 20 is caused to vibrate by being linked to input vibrations through an actuator formed of the voice coil 39. The spring constant of the engine mount can be changed as desired by this mechanism. The electronically controlled engine mount also includes a map memory means which is formed of the ROM 60 in the ECU 4 and in which the relationship between maximum values of a control signal to the actuator and phase angles with respect to input vibrations for setting a minimum or maximum spring constant according to the rotational speed of the engine 2 is stored as a map. The electronically controlled engine mount further includes an actuator driving means formed of the voice coil drive circuit 62 in the ECU 4. The driving means calculates a maximum value of the control signal and a phase angle with respect to a present engine speed on the basis of the map stored in the map memory means, and drives the actuator on the basis of the maximum value and the phase angle calculated.

Therefore, an optimal vibration phase and an optimal amplitude for control can be easily obtained according to the engine speed on the basis of the software incorporated in the ECU to suitably control the actuator so that vibrations from the engine to the vehicle body are reduced.

The map may be used in various forms. For example, the map may be stored by being transformed into a function. The interpolating calculation is not always necessary. Peak current values and phase angles may be assigned with respect to engine speed ranges. Vibrations from the engine to the vehicle body can be sufficiently limited by using such values. Further, the control signal for obtaining an optimal amplitude and an optimal vibration phase is not limited to a current value; it may be provided as a voltage value according to the kind of the actuator.

Incidentally, even when the engine speed is constant, the explosion vibromotive force varies depending upon the engine load. Correspondingly, the current value Ip and the phase angle $\Delta\theta$ at which the absolute spring constant becomes zero vary. Then, the arrangement may be such that a means for detecting the engine load (for example, through the throttle opening) is provided and one of different maps is selected according to the load detected by this detection means. By using such means, it is possible to obtain an optimal spring constant no matter what the engine load and to arrange an electronically controlled engine mount capable of being further finely controlled for vibration isolation.

Second embodiment

A second embodiment of the present invention will now be described. A mounting apparatus in accordance with the second embodiment differs from the first embodiment in the construction of a portion of the engine mount unit 3 but is identical to the first embodiment with respect to other portions. Therefore, the difference from the first embodiment will be mainly described.

Figure 16:
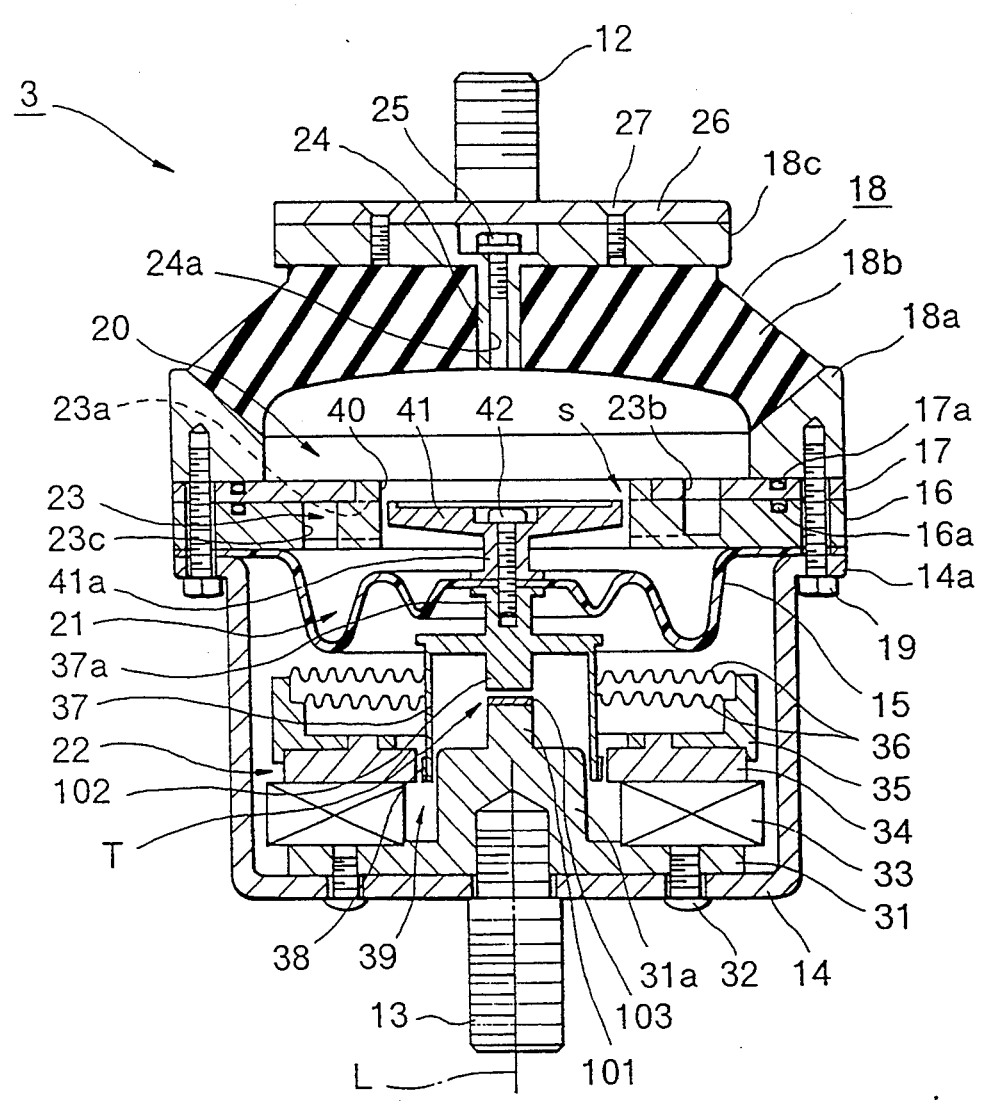
FIG. 16 is a cross-sectional view of an engine mount unit in a power unit mounting apparatus in accordance with a second embodiment of the present invention.

FIG. 16 is a cross-sectional view of details of the engine mount unit in the power unit mounting apparatus in accordance with the second embodiment of the present invention.

As illustrated, a stopper portion 101 is formed on a central upper surface portion of the cylindrical portion 31a of the first magnetic member 31, and a cushion member 103 made of rubber is bonded to the upper surface of the stopper portion 101. A stopper portion 102 is protrusively formed on a central lower surface portion of the yoke 37 so as to face the stopper portion 101. A gap T is formed between the stopper portions 101 and 102. The size of the gap T is selected so that the stopper portions 101 and 102 do not contact each other when the yoke 37 is displaced to the lowermost position (the lift 1 is maximized in a downward stroke).

When the voice coil 39 vibrates the moving plate 41 on the basis of the drive current i, the two stopper portions 101 and 102 do not contact each other and a reduction in the vibration transmission rate by an opposite-phase control and limitation of engine shakes by an equal-phase control can be achieved as in the first embodiment.

If an excessively large vibration stroke in the compressing direction is input to the engine mount unit 3 by a very large engine shake, the pressure in the main fluid chamber 20 is abnormally increased with bending of the elastic member 18b so that the moving plate 41 is strongly pressed downward by a force larger than the force of driving the voice coil 39. In such a situation, the two stopper portions 101 and 102 are brought into contact with each other to limit the downward movement of the yoke 37, thereby preventing a detrimental result such as damage to the dampers 36. In this embodiment, therefore, the reliability of the voice coil 39 and, hence, the reliability of the mounting apparatus can be improved while the above-described various advantages are achieved.

The above-mentioned cushion member 103 serves to moderate the impact of contact between the two stopper portions 101 and 102. The cushion member 103 may be formed of a disc spring or the like instead of being formed of rubber.

Third Embodiment

A third embodiment of the present invention will be described below. A mounting apparatus in accordance with the third embodiment differs from the first embodiment in the construction of a portion of the engine mount unit 3 but is identical to the first embodiment with respect to other portions. Therefore, the difference from the first embodiment will be mainly described.

Figure 17:
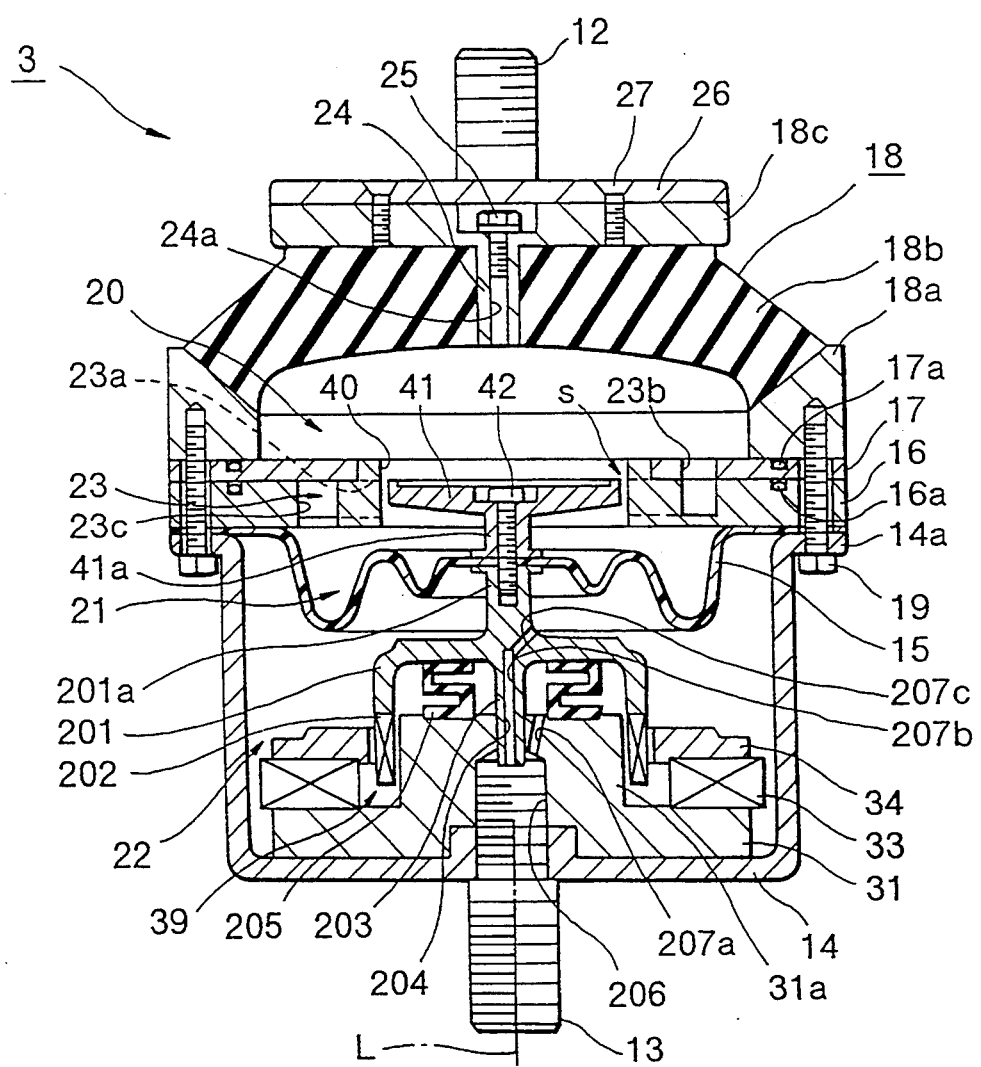
FIG. 17 is a cross-sectional view of an engine mount unit in a power unit mounting apparatus in accordance with a third embodiment of the present invention.

FIG. 17 is a cross-sectional view of details of the engine mount unit in the power unit mounting apparatus of the third embodiment of the present invention.

As illustrated, a yoke 201 of a voice coil 39 is a cylindrical member closed at its top and opened at its bottom. As in the case of the first embodiment, a moving coil 202 provided at a lower end of the yoke 201 is positioned between the outer circumference of the cylindrical portion 31a of the first magnetic member 31 and the inner circumference of the second magnetic member 34, and the moving plate 41 is connected to an attachment portion 201a formed on an upper portion of the yoke 201. A guide rod 203 is formed so as to project from a central lower surface portion of the yoke 201. The guide rod 203 is inserted into a guide hole 204 formed in the cylindrical portion 31a of the first magnetic member 31 so as to be movable along the axis L. A ring-like damper 205 made of rubber and having an S-shaped cross section is disposed between a lower surface of the yoke 201 and an upper surface of the cylindrical portion 31a so as to surround the guide rod 203. Upper and lower portions of the damper 205 are respectively bonded to the yoke 201 and the cylindrical portion 31a.

In the cylindrical portion 31a of the first magnetic member 31 are formed a threaded hole 206 into which a bolt for fixation to the vehicle body 1 is screwed and an air bleed hole 207a which provides a communication between the interior of the threaded hole 206 and a space inside the damper 205. In the guide rod 203 are formed air bleed holes 207a and 207b for communication between the interior of the threaded hole 206 and the interior of the air chamber 22. These air bleed holes 207a to 207c provide a communication between the space inside the damper 205 and the interior of the air chamber 22.

When a drive current i is caused to flow through the moving coil 202, the yoke 201 moves by being guided along the axis L to vibrate the moving plate 41, with the guide rod 203 sliding in the guide hole 204 of the first magnetic member 31, thereby achieving a reduction in the vibration transmission rate by an opposite-phase control and limitation of engine shakes by an equal-phase control as in the case of the first embodiment. That is, in this embodiment, the yoke 201 is guided by the guide rod 203 and the guide hole 204 used instead of the nonwoven fabric dampers 36 of the first embodiment. Accordingly, the yoke 201 and the cylindrical portion 31a of the first magnetic member 31 are maintained in improved coaxial alignment, as in the case of the first embodiment, and the air gap between the second magnetic member 34 and the moving coil 202 is further reduced to improve the efficiency.

When the yoke 201 vibrates, air flows between the space inside the damper 205 and the interior of the air chamber 22 via the air bleed holes 207a to 207c so that excess air inside the tightly closed damper 205 is discharged or air is introduced in the case of air deficiency.

In the above-described embodiments, the vibration damping of the moving plate 41 is assisted by using the orifice 23 in the low-frequency range of 40 Hz or lower. However, this embodiment is not limited to this arrangement. For example, the orifice 23 may be removed and a damping effect may be obtained only by an opposite-phase control of the moving plate in the low-frequency range. Alternatively, the arrangement may be such that the drive of the voice coil 39 is stopped in the low-frequency range of 40 Hz or lower and a damping effect is obtained only by the orifice 23.

In the electronically controlled engine mount of the present invention, as described above, a moving member is vibrated by being linked to vibrations input from the engine by an actuator formed of a voice coil, whereby the spring constant of the engine mount can be changed freely so that vibrations from the engine are prevented from being transmitted to the vehicle body. The gap between the moving member and a magnetic member magnetized by a permanent magnet, into which a moving coil formed integrally with the moving member is inserted, is set to 1.5 mm or less. It is therefore possible to increase the gap magnetic flux density even if a permanent magnet having a smaller residual magnetic flux density, e.g., a ferrite magnet or the like, is used. Thus, the actuator can be arranged to have an increased maximum power output by using a low-priced magnetic material and without increasing its external size.

In the electronically controlled engine mount of the present invention, as described above, the moving member is vibrated by being linked to vibrations input from the engine by the actuator, whereby the spring constant of the engine mount can be changed freely so that vibrations from the engine are prevented from being transmitted to the vehicle body. For this operation, the relationship between maximum values of a control signal and phase angles for setting a minimum or maximum spring constant with respect to the rotational speed of the engine is stored as a map. A maximum value and a phase angle of the control signal with respect to the present engine speed are calculated on the basis of the map, and the actuator is driven on the basis of the maximum value and the phase angle calculated. The spring constant of the engine mount is thereby changed with respect to vibrations caused by engine revolutions. An optimal vibration effect can therefore be achieved through the entire engine speed range.

In the power unit mounting apparatus of the invention described above, a fluid seal is maintained between the main and sub fluid chambers by reducing the distance between the moving member and the opposing surface of the communication hole and by utilizing the viscosity of the non-compressive fluid. There is therefore no need for a particular fluid sealing member, and there is no possibility of the vibration of the moving member being impeded by such a fluid sealing member. It is therefore possible to control the dynamic spring constant always accurately by smoothly transmitting vibrations from the moving member to the non-compressive fluid in the main fluid chamber. Moreover, since the actuator is not influenced by the fluid sealing member, the efficiency of the actuator can be improved and the size of the actuator and, hence, the overall size of the apparatus can be reduced.

What is claimed is:

1. A vibration isolator provided between a vibration source and a base on which said vibration source is supported, said vibration isolator comprising:
   an elastic member provided between said vibration source and said base to elasticity support said vibration source;
   a main chamber in which a fluid is enclosed, wherein a volume of said main chamber is changed by a deformation of said elastic member;
   a sub chamber defined by an elastic membrane, said main chamber and said sub chamber together defining a fluid chamber;
   a partition provided between said main chamber and said sub chamber, wherein a communication hole is defined in said partition to connect said main chamber and said sub chamber;
   a moving member provided within said communication hole, said moving member having a surface that applies a force on a fluid contained within said main chamber, said force changing said volume of said main chamber, and a peripheral wall, said moving member being located within said communication hole such that a gap is defined between a wall of said communication hole and said peripheral wall of said moving member;
   an actuator for driving said moving member; and
   attaching means for affixing said actuator to said elastic membrane in a fluid sealing manner, said actuator driving said moving member from a location outside said fluid chamber through said attaching means.

2. A vibration isolator according to claim 1, wherein said moving member comprises a plate disposed so as to be movable in said communication hole in an axial direction of said communication hole.

3. A vibration isolator according to claim 2, wherein an orifice having a predetermined length is defined in said partition, said orifice connecting said main chamber and said sub chamber.

4. A vibration isolator according to claim 1, further comprising stopper means for limiting displacement of said moving member when a pressure of said fluid in said main chamber is abruptly increased.

5. A vibration isolator according to claim 4, wherein said stopper means comprises a cushion member.

6. A vibration isolator according to claim 1, further comprising a controller for controlling movement of said moving member caused by said actuator.

7. A vibration isolator according to claim 6, wherein said vibration source is an internal combustion engine, and said controller includes a rotational angle sensor for detecting a rotational angle of a crank shaft in said internal combustion engine and controls movement of said moving member according to an output from said rotational angle sensor.

8. A vibration isolator according to claim 6, wherein said controller causes said moving member to vibrate in phase opposition to vibrations of said vibration source to reduce a spring constant of said vibration isolator when a frequency of vibration of said vibration source is in a high-frequency range higher than a predetermined frequency.

9. A vibration isolator according to claim 8, wherein an orifice is defined in said partition to connect said main chamber to said sub chamber so that said spring constant of said vibration isolator is reduced by a movement of said fluid through said orifice when said frequency of vibration of said vibration source is in a low-frequency range lower than a predetermined frequency.

10. A vibration isolator according to claim 6, wherein said vibration source comprises an internal combustion engine, and said controller causes said moving member to vibrate in phase opposition to vibrations of said internal combustion engine during idling or steady operation of said internal combustion engine so as to reduce a spring constant of said vibration isolator during idling or steady operation of said internal combustion engine, and causes said moving member to vibrate in phase with vibrations of said internal combustion engine during transient operation of said internal combustion engine to increase said spring constant of said vibration isolator during transient operation of said internal combustion engine.

11. A vibration isolator according to claim 6, wherein said controller saves electric power in such a manner so as to cause said moving member to vibrate at a large amplitude when a frequency of vibration of said vibration source is lower than a predetermined lower frequency and to cause said moving member to vibrate at a small amplitude when said frequency of vibration of said vibration source is higher than a predetermined high frequency.

12. A vibration isolator according to claim 1, wherein said gap defined between said wall of said communication hole and said peripheral wall of said moving member is sized so as to enable said moving member to move freely within said partition while preventing substantial movement of said fluid between said main chamber and said sub chamber such that said communication hole is hydrodynamically substantially closed.

13. A vibration isolator provided between a vibration source and a base on which said vibration source is supported, said vibration isolator comprising:
   an elastic member provided between said vibration source and said base to elasticity support said vibration source;
   a main chamber in which a fluid is enclosed and, wherein a volume of said main chamber is changed by a deformation of said elastic member;
   a sub chamber defined by an elastic membrane, said main chamber and said sub chamber together defining a fluid chamber;
   a moving member provided in said fluid chamber defined by said main chamber and said sub chamber;
   an actuator for driving said moving member, wherein said actuator comprises a voice coil type actuator having:
      fixed magnetic poles defining a direct current magnetic field;
      a moving coil located within said direct current magnetic field; and
      a yoke for movably supporting said moving coil; and
   attaching means for affixing said actuator to said elastic membrane in a fluid sealing manner, said actuator driving said moving member from a location outside said fluid chamber through said attaching means.

14. A vibration isolator according to claim 13, wherein said voice coil type actuator has a plurality of dampers movably supporting said yoke.

15. A vibration isolator according to claim 13, wherein said fixed magnetic poles are formed by a ferrite magnet and a gap length Lg defined by said fixed magnetic poles is 1.5 mm or less.

16. A vibration isolator according to claim 13, further comprising guide means for guiding movement of said yoke in an axial direction.

17. A vibration isolator according to claim 16, wherein said guide means comprises a guide rod extending from said yoke in an axial direction and a guide hole in which said guide rod slides.

18. An engine mounting apparatus provided between an engine and a vehicle body, comprising:
   a first attachment assembly located on said engine;
   a second attachment assembly located on said vehicle body;
   a housing assembly fixed to said second attachment assembly;
   an elastic member provided between said second attachment assembly and said housing assembly to elastically support said engine;
   a partition provided in said housing assembly, said elastic member and said partition defining a main fluid chamber therebetween, said partition having a communication hole defined therethough;
   a moving member accommodated in said communication hole so as to be movable in an axial direction of said communication hole, said moving member having a surface that applies a force on a fluid contained within said main chamber so as to change said volume of said main chamber, and a peripheral wall, said moving member being located within said communication hole such that a gap is defined between a wall of said communication hole and said peripheral wall;

an elastic membrane provided on a side of said partition facing an interior of said housing assembly, said elastic membrane covering at least said communication hole so that a sub fluid chamber is defined between said elastic membrane and said partition, and wherein an air chamber is defined between said elastic membrane and a portion of said housing assembly;

an actuator located in said air chamber and having a moving portion capable of moving along a direction of movement of said moving member; and attachment means for connecting said elastic membrane and said moving member in said sub fluid chamber and for connecting said elastic membrane and said moving portion of said actuator in said air chamber.

19. An engine mounting apparatus according to claim 18, further comprising:
   a rotational angle sensor for detecting a rotational angle of said engine; and
   a controller which makes said actuator vibrate said moving member by generating a signal for driving said actuator in synchronization with said rotational angle of said engine detected by said rotational angle sensor.

20. An engine mounting apparatus according to claim 18, wherein said gap defined between said wall of said communication hole and said peripheral wall of said moving member is sized so as to enable said moving member to move freely within said partition while preventing substantial movement of said fluid between said main chamber and said sub chamber such that said communication hole is hydrodynamically substantially closed.

* * * * *